US011556879B1

(12) United States Patent
Timmons et al.

(10) Patent No.: US 11,556,879 B1
(45) Date of Patent: Jan. 17, 2023

(54) MOTION DATA DRIVEN PERFORMANCE EVALUATION AND TRAINING

(71) Applicant: Amazon Technologies, Inc., Seattle, WA (US)

(72) Inventors: Aaron Timmons, Kansas City, KS (US); Jonathan Evan Cohn, Winchester, MA (US)

(73) Assignee: Amazon Technologies, Inc., Seattle, WA (US)

( * ) Notice: Subject to any disclaimer, the term of this patent is extended or adjusted under 35 U.S.C. 154(b) by 1002 days.

(21) Appl. No.: 15/620,625

(22) Filed: Jun. 12, 2017

(51) Int. Cl.
*G06Q 10/06* (2012.01)
*G06T 7/20* (2017.01)
*G06Q 10/08* (2012.01)
*G09B 19/00* (2006.01)

(52) U.S. Cl.
CPC ... *G06Q 10/0639* (2013.01); *G06Q 10/06398* (2013.01); *G06Q 10/08* (2013.01); *G06T 7/20* (2013.01); *G09B 19/003* (2013.01)

(58) Field of Classification Search
CPC .................................................. G06Q 10/06
See application file for complete search history.

(56) References Cited

U.S. PATENT DOCUMENTS

| 8,244,603 B1* | 8/2012 | Tang ................... G06Q 10/0633 705/28 |
| 8,688,598 B1* | 4/2014 | Shakes ................ G06Q 10/08 705/332 |
| 9,129,250 B1* | 9/2015 | Sestini ................ G06Q 10/087 |
| 2005/0278062 A1* | 12/2005 | Janert .................... G06Q 50/28 700/214 |
| 2009/0213114 A1* | 8/2009 | Dobbins ................ G06F 3/011 345/419 |

(Continued)

FOREIGN PATENT DOCUMENTS

WO   WO-2016187673 A1 * 12/2016 ......... A63B 24/0006

OTHER PUBLICATIONS

Ng, A. "Part V: Support Vector Machines." CS229 Lecture Notes, Stanford University. Web Archive, Apr. 25, 2014, <//web.archive.org/web/20140425063301/http://cs229.stanford.edu/notes/cs229-notes3.pdf>, Accessed Apr. 27, 2020. (Year: 2014).*

(Continued)

*Primary Examiner* — Kurtis Gills
(74) *Attorney, Agent, or Firm* — Patterson + Sheridan, LLP

(57) ABSTRACT

Method and apparatus for evaluating user movement in a fulfillment center. A plurality of sub-tasks for performing a fulfillment operation are determined. Embodiments retrieve a training set of motion data that includes a plurality of training motion data samples, each specifying motion data over a respective window of time, and train a first data model to classify instances of motion data into portions, based on the plurality of sub-tasks. At least one data model is trained to assess performance of the fulfillment operation, using the training set of motion data. An instance of motion data describing motion performed during the fulfillment operation is received, the instance of motion data is divided into a plurality of portions, using the first data model, and a measure of quality is generated, by analyzing the plurality of portions of the instance of motion data using the trained at least one data model.

14 Claims, 15 Drawing Sheets

(56) References Cited

U.S. PATENT DOCUMENTS

| | | | |
|---|---|---|---|
| 2012/0122062 A1* | 5/2012 | Yang | G09B 23/28 |
| | | | 434/219 |
| 2013/0173212 A1* | 7/2013 | Saiki | G06Q 10/0639 |
| | | | 702/150 |
| 2013/0209976 A1* | 8/2013 | Postlethwaite | G09B 19/003 |
| | | | 434/234 |
| 2016/0081594 A1* | 3/2016 | Gaddipati | A61B 5/0077 |
| | | | 600/595 |
| 2016/0086500 A1* | 3/2016 | Kaleal, III | A61B 5/41 |
| | | | 434/257 |
| 2016/0125348 A1* | 5/2016 | Dyer | G06Q 50/28 |
| | | | 705/7.42 |
| 2016/0239769 A1* | 8/2016 | Modi | G06Q 10/06395 |
| 2016/0275805 A1* | 9/2016 | Reichow | G16H 20/30 |
| 2017/0278034 A1* | 9/2017 | Kodeswaran | G06Q 10/0639 |

OTHER PUBLICATIONS

Hsu, C., Lin, C. "A Comparison of Methods for Multi-class Support Vector Machines." IEEE Transactions on Neural Networks, vol. 13, No. 2, Mar. 2002, pp. 415-425. (Year: 2002).*

Mahmoud Moussa, Monitoring Employee Behavior Through the Use of Technology and Issues of Employee Privacy in America, SAGE Open, Apr.-Jun. 2015 (Year: 2015).*

* cited by examiner

|  | Ergonomics | Safety | Efficiency | Quality | Task Time Analysis |
|---|---|---|---|---|---|
| Login to Station | 87 | 81 | 85 | 70 | 82 |
| Select Stow Workflow | 83 | 74 | 81 | 84 | 83 |
| Pods Show Up | 88 | 61 | 79 | 79 | 79 |
| Scan a Container | 80 | 84 | 80 | 78 | 81 |
| Pick a Product Out of the Container | 74 | 90 | 94 | 84 | 75 |
| Identify Target Bin for the Product | 77 | 88 | 81 | 86 | 87 |
| Make Room for Product/Place Product in Bin | 44 | 60 | 92 | 69 | 94 |
| Scan Bin | 61 | 77 | 81 | 70 | 88 |

FIG. 7

MOTION DATA DRIVEN PERFORMANCE EVALUATION AND TRAINING

BACKGROUND

The present description relates to motion analysis, and more specifically, to using data models to assess captured motion data to determine the efficacy of a performance of a fulfillment operation.

Modern inventory systems, such as those in mail-order warehouses, supply chain distribution centers, and custom-order manufacturing facilities, face significant challenges in responding to requests for inventory items. As inventory systems grow, the challenges of simultaneously completing many packing, storing, and other inventory-related tasks become non-trivial. For instance, in product distribution centers (e.g., fulfillment centers), vast quantities of products are processed for shipment to consumers traditionally using manual labor and/or mechanical handling equipment.

Inventory systems that are tasked with responding to large numbers of diverse inventory requests typically exhibit inefficient utilization of system resources, including space and equipment, and may further exhibit inefficient performance of fulfillment operations by employees. In many situations, employees may not realize they are performing a given task in a less than optimal manner or in a manner that may result in injury to the employee over time. As a result, inventory systems may experience lower throughput, unacceptably long response times, and an ever-increasing backlog of unfinished tasks, and employee safety may be negatively impacted.

BRIEF DESCRIPTION OF DRAWINGS

FIG. 7 illustrates an evaluation summary report, according to one embodiment described herein.

DETAILED DESCRIPTION

Figure 1:
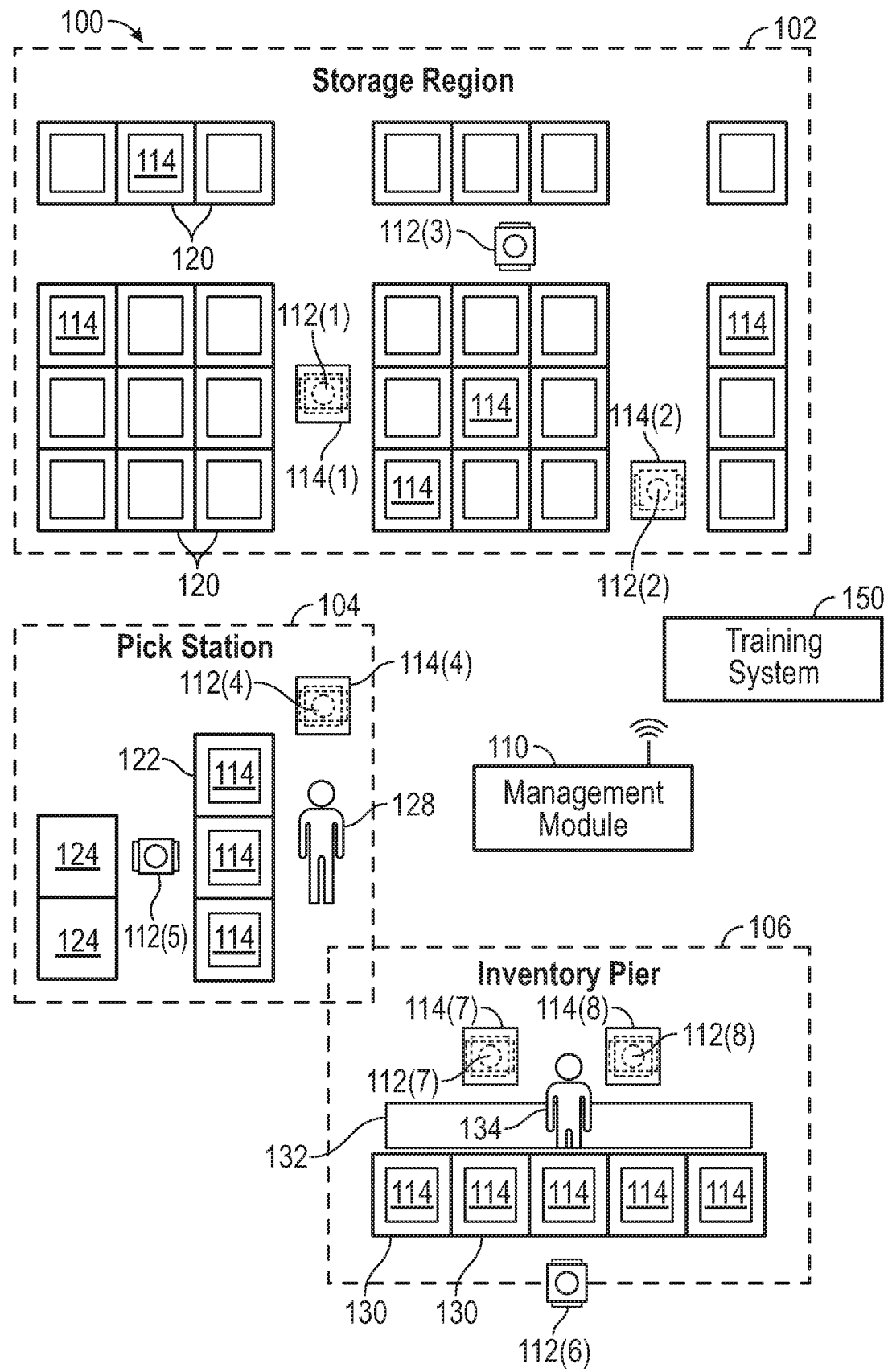
FIG. 1 illustrates an inventory system having multiple regions and mobile drive units that carry inventory holders about the regions.

Inventory systems are utilized by many entities for storing and managing inventory. For example, some retailers may utilize a warehouse of racks that store inventory items in various bins. When an order for a specific inventory item needs to be filled by the retailer, a worker typically retrieves the inventory item from the bin where the inventory item is stored.

Inventory systems according to one embodiment described herein utilize one or more mobile drive units to automatically retrieve inventory holders from warehouse storage. The inventory holders may be entire racks of shelves, with each shelf having bins for various inventory items. Mobile drive units may be self-powered robotic devices configured to move freely about the warehouse. Racks may be transported by mobile drive units to a pick station for performing inventory operations. The station may include a human operator and/or automated equipment to remove desired inventory items from the inventory holders and complete orders. In some operations, the items are removed from inventory holders and placed on order holders, which too can be maneuvered by the mobile drive units. Throughout this document, reference is made to inventory holders as the racks that are moved about by the mobile drive units. It is noted that inventory holders is used in the general sense as structures that hold inventory items, items that are part of an order, packaging elements for the orders, and essentially any other item or element that might be used by the inventory and fulfillment system. As such, inventory holders may also be referred to as holders, order holders, container holders, bins, and so forth.

Mobile drive units may move about the warehouse and/or retrieve inventory holders in response to commands and/or instructions received from an automated guidance system. For example, a management module may control administration and coordination of certain elements and/or tasks within the warehouse. The management module may receive orders for inventory items in the warehouse and coordinate task assignments for fulfilling the orders, including providing instructions to mobile drive units to transport racks with requested inventory items to an inventory station for completion of an order. The management module may also provide guidance at the inventory station for how the order is to be assembled.

In a distribution warehouse for an office supply store, the management module may receive an order for a printer, several ink cartridges, and a box of paper. The management module may determine the locations of these items within the racks of storage in the distribution warehouse. The items may, for instance, be on the shelves of three separate racks. The management module may issue tasks for three different mobile drive units to retrieve each rack respectively holding the printer, ink cartridges, and paper, and for the mobile drive units to transport the racks holding those items to an inventory station where the three items may be picked from the racks and packed into a box for shipment. In doing so, the management module may coordinate the various tasks such that all of the orders received by the management module are fulfilled in an efficient manner.

The mobile drive units are continuously moving the inventory holders into and out from the pick stations to place the appropriate items near the pickers at the right time. For existing pick stations, current inventory systems face a challenge of increasing the lines per hour so that pickers may retrieve more items per hour, thereby improving efficiency and throughput of the inventory system.

Employee training constitutes a significant expense within a fulfillment system environment. For a newly hired employee, it may take days if not weeks until that employee is operating at an average level of efficiency. Moreover, such training may need to be done by an already trained employee, thereby lowering the trained employees productivity during the training process. Even once an employee is trained, it can be difficult to continuously monitor their performance and to address any issues that arise. Typically such assessments are done by periodic audits. However, such processes may allow issues to persist for a significant amount of time, and such audits may not catch all the issues in a given employee's performance. For example, a particular employee may tend to lift heavy items with poor technique (e.g., using his lower back), which can result in injury to the employee over time. Even if such an issue is caught during an audit, the employee may have already sustained injury by that time.

In some cases, performance issues can be subtle and an employee may not realize there is a more optimal way to perform a given process. As an example, an employee may be able to perform a given fulfillment operation slightly faster if the employee gets into position to retrieve an item from an inventory holder, before the mobile drive unit carrying the inventory holder arrives at the pick station. While such slight gains in performance may appear insignificant to the employee and may be difficult to detect even during an audit, these performance gains may result in a substantial cost savings when viewed in the aggregate across all of the employees in multiple fulfillment centers.

As such, embodiments provide techniques for monitoring employee movement using motion capture devices and analyzing the collected motion data to assess the employee's performance. In one embodiment, a motion capture system can monitor behavior of fulfillment center employees performing a fulfillment operation to collect instances of motion data. For example, each of the collected instances of motion data can correspond to one of the fulfillment center employees performing a given task over a window of time (e.g., a pick operation at a pick station for a single item). A motion analysis component could then train one or more data models using the collected instances of motion data, for use in assessing employee performance of the fulfillment operation. For example, the collected instances of motion data could be scored based on their efficiency, and the motion analysis component could use the collected instances of motion data and their efficiency scores to train a data model to predict efficiency scores when given an additional instance of motion data as input. A given employee performing the fulfillment operation could then be monitored using the motion capture devices and the motion data collected could be analyzed using the trained data model to calculate an efficiency score for the employee.

FIG. 1 shows one illustrative example of an inventory system 100 that may be used to implement a technique for efficient shuffling of inventory holders. The inventory system 100 may be arranged in a facility or warehouse (e.g., distribution facility, fulfillment center, etc.) that is logically organized into areas or regions associated with various functions. In the illustrated example, the warehouse includes a storage region 102, a pick station 104, and an inventory pier 106. In practice, depending upon the size of the inventory system 100, the warehouse may hold more than one of the storage regions 102, pick stations 104, and inventory piers 106, or the warehouse may be configured without the storage region 102, or the pick station 104, or the inventory pier 106.

The inventory system 100 includes a management module 110, multiple mobile drive units 112, inventory holders 114 and a training system 150. Only some of the inventory holders 114 are shown referenced with the number 114 for ease of illustration. The mobile drive units 112 are independent, self-powered robotic devices that may move freely about the warehouse, under their own direction or through coordination by the management module 110. The mobile drive units 112 may be used at various times to transport the inventory holders 114 around the warehouse among the regions. For instance, the mobile drive units 112 may transport the inventory holders 114 between the storage region 102 and the pick station 104 or inventory pier 106.

Each inventory holder 114 may be implemented as a physical structure to hold various inventory items. The inventory holder 114 has a physical length, width, and height that may be standardized or varied within the inventory system. As used herein, the inventory holders 114 may be configured to hold essentially any type or size of item or be used for any number of purposes, including, but not limited to, carrying pallets, storing shipping supplies, holding garbage, supporting empty boxes waiting for inventory, supporting filled boxes with items once orders are fulfilled, and so on. Furthermore, as used herein, inventory holders also include holders for other types of products or items and hence include order holders.

In one implementation, the inventory holder 114 may be formed as a rack having multiple shelves to support various types of inventory items. For instance, the inventory holders 114 may include multiple storage bins with each storage bin capable of holding a different type of inventory item. The inventory holders 114 are capable of being carried, rolled, or otherwise moved by the mobile drive units 112. Each inventory holder 114 may have a plurality of faces, and each bin may be accessible through specific faces. The rack is free-standing when at rest, but can be lifted and moved by the mobile drive units 112. The mobile drive units 112 may be configured to rotate inventory holders 114 at appropriate times to present particular faces of inventory holders 114 and the associated bins to an operator or other components of inventory system 10. One example is described below in more detail with reference to FIG. 2.

One or more mobile drive units 112 are provided in the storage region 102 to shuffle inventory holders 114 among the storage locations 120 and to transport the inventory holders between the storage region and other regions in the warehouse. Two loaded drive units 112(1) and 112(2) are shown in the storage area 102 carrying associated inventory holders 114(1) and 114(2), respectively, down aisles between the sets of predefined storage locations 120. An unloaded drive unit 112(3) is also shown moving through an aisle between the predefined storage locations 120.

The pick station region 104 is designed with multiple locations 122 and 124 to accommodate associated resting inventory holder 114. In FIG. 1, the pick station 104 has five locations arranged in two linear rows. A first line of three pick locations 122 is mapped next to a picking area in which a picker 126 picks inventory from the inventory holders 114 at the pick locations 122 and loads them into boxes or containers supported by another inventory holder 114(4) mounted on a mobile drive unit 112(4). In this illustration, the picker 126 is a human, although the picker may alternatively or additionally involve a mechanical picking apparatus. A second line of two staging locations 124 is mapped adjacent to, but spaced from, the first line of pick locations 122. The staging locations 124 temporarily hold inventory holders 114 on the way to and from the pick locations 122 of the pick station 104. It is noted that five locations are merely representative, and that pick stations 104 may be designed with more or fewer than five locations.

Order holders may, for example, be racks of shelving that are configured to hold boxes or containers that will be used to fill orders for inventory items. Each box or container may be associated with a particular order. For instance, an order holder may store a cardboard box that is to be used for shipping an order for several ink cartridges and several reams of paper. Order holders with orders needing such items may visit positions along the inventory pier corresponding to inventory holders storing inventory items needed by the orders. Operators may remove items from the inventory holders and place them into appropriate boxes or containers in the order holder. If necessary, the order holder may then be taken to an inventory station to fill items remaining on the orders in the boxes or containers of the order holder.

To illustrate, in the office supply example discussed above, paper may be a high volume inventory item and ink cartridges may be a highly popular item. Accordingly, a pallet of paper and an inventory holder storing various ink cartridges may be stationed at the inventory pier. An order for several packages of paper and an ink cartridge may be filled by moving an order holder a location along the inventory pier opposite to the pallet storing the paper where an operator may transfer the paper to the order holder. The order holder may then move to a location opposite the inventory holder storing the ink cartridges where the same or a different operator may transfer the ink cartridge to the order holder. If the requested printer is not already stored at the inventory pier, a mobile drive unit may transport the order holder to an inventory station, where another mobile drive unit may transport an inventory holder containing the printer so that the order can be filled.

In FIG. 1, the inventory pier 106 is shown with multiple designated pier locations 130 to accommodate the inventory holders 114. Five pier locations 130 are illustrated to accommodate five corresponding holders 114, although there may be more or fewer pier locations per inventory pier 106. One mobile drive unit 112(6) is shown at the inventory pier 106 to shuffle inventory holders 114 among the pier locations 130 according to the techniques described herein. Two loaded mobile drive units 112(7) and 112(8) are shown at rest next to a pier 132 and holding associated inventory holders 114(7) and 114(8) (or more specifically in this case, order holders) for access by a picker 134 (again, represented as a human although a mechanical device may be used). In this example, the inventory holders 114(7) and 114(7) may be holding packages or containers for order fulfillment, where the picker 134 removes selected items from the inventory holders 114 positioned in pier locations 130 and loads the items into order containers on the inventory holders 114(7) and 114(8).

In some implementations, multiple mobile drive units may be used to bring inventory holders to and from the pier locations 130 of the inventory pier 106. Incoming inventory holders may be placed in temporary locations while a single mobile drive unit, such as unit 112(6), removes an existing inventory holder that has been recently picked by the picker 134 from a pier location 130 and replaces it with a new inventory holder with new items of interest for the picker 134.

In one implementation, the management module 110 orchestrates movement of the mobile drive units 112, directing them to various regions within the warehouse. The management module 110 coordinates transport of the various inventory holders among the regions in the warehouse. Furthermore, the management module 110 may be used to instruct the mobile drive units to perform the shuffle processes within a particular region (e.g., storage region 102, pick station 104, inventory pier 106, etc.). Generally, the shuffle process involves directing a mobile drive unit 112 to reposition a first inventory holder from its current location within the region to a temporary location within the region that is adjacent or proximal to the current location. The mobile drive unit 112 leaves the first inventory holder in the temporary location and subsequently positions a second inventory holder into the location vacated by the first inventory holder. The mobile drive unit 112 then lifts the first inventory unit to transport the first inventory holder away.

The management module 110 may use any form of communication to direct the mobile drive units. In one implementation, the management module 110 and the mobile drive units are configured to communicate using wireless technologies, such as a wireless local area network (WLAN). As one example, some embodiments of mobile drive unit 112 may communicate with management module 110 and/or with one another using Wi-Fi (IEEE 802.11), Bluetooth (IEEE 802.15), Infrared Data Association standards, or any other appropriate wireless communication protocol. As another example, in a tracked inventory system 100, tracks or other guidance element upon which mobile drive units 112 move may be wired to facilitate communication between mobile drive units 112 and the management module 110 and/or other components of inventory system 100.

In addition to directing the mobile drive units, the management module 110 may receive and/or generate requests to initiate any of a number of particular operations involving the mobile drive units 112, inventory holders 114, or other elements of inventory system 100. The management module 110 may select components of inventory system 100 to perform various operations and communicate commands, instructions, and/or other appropriate information to the selected components to facilitate completion of these operations. The management module 110 may receive orders for various inventory items and coordinate and administer various appropriate tasks to fill the orders. For example, an order may specify particular inventory items that have been purchased by a customer and that are to be retrieved from inventory system 10 for shipment to the customer. The management module 110 may receive the orders from any appropriate system and generates task assignments based, in part, on the orders including requests for inventory items. Based on the orders, the management module 110 may identify particular operations to be completed involving inventory items stored or to be stored within inventory system 100.

After generating one or more task assignments, the management module 110 selects appropriate components to complete particular tasks and transmits task assignments to selected components, such as the mobile drive units, to trigger completion of the relevant tasks. The relevant components then execute their assigned tasks. Each task assignment defines one or more tasks to be completed by a particular component. These tasks may relate to the retrieval, storage, replenishment, and counting of inventory items and/or the management of mobile drive units 112, inventory holders 114, or other components of inventory system 100. Depending on the component and the task to be completed, a particular task assignment may identify locations, components, and/or actions associated with the corresponding task and/or any other appropriate information to be used by the relevant component in completing the assigned task.

The training system 150 is generally configured to evaluate the performance of an employee performing a fulfillment operation (e.g., a pick operation at the pick station 104). Of note, while the training system 150 is depicted within a fulfillment center in FIG. 1, more generally the training system 150 can be located in any suitable environment, including not only the fulfillment center but also remote computing environments (e.g., a cloud computing environment). In such an embodiment, motion data collected within the fulfillment environment could be transmitted to the remote computing environment for analysis by the training system 150. In evaluating an employee's performance, the training system 150 could determine a plurality of sub-tasks for carrying out a fulfillment operation. For instance, in a given fulfillment center, a pick operation could include the operations of logging into a workstation, selecting the pick workflow on the workstation, scanning an empty tote, confirming the tote location in the tote rack, waiting on the inventory holder to arrive, fetching an item from the begin in the inventory holder, scanning the item and putting the item in the tote and pressing a light on the tote rack.

The training system 150 could retrieve a training set of motion data that includes a plurality of training motion data samples, each specifying motion data over a respective window of time. For example, employees working in the pick station 104 could be monitored performing pick operations over a period of time, using motion capture devices (e.g., motion capture cameras, motion capture devices worn by the employees, etc.). The training system 150 could then train a first data model to classify instances of motion data into portions, based on the plurality of sub-tasks. For instance, a user could specify, for each of the instances of motion data, which temporal portion of the instance of motion data corresponds to which sub-task. As an example, the user could specify that the motion data from time $T_1$ to time $T_2$ corresponds to the user logging into the workstation, the motion data from time $T_2$ to time $T_3$ corresponds to the user selecting the pick workflow on the workstation, and so on. Using such information, the training system 150 could train a data model to divide an instance of motion data into portions corresponding to the various sub-tasks of the workflow. In doing so, the training system 150 could use information in addition to the motion data, such as the performance of various actions on the workstation (e.g., when the workstation received the command from the user to login) and within the pick station 104 (e.g., when the user scanned the empty tote using an electronic scanning device).

Additionally, the training system 150 can train at least one data model to assess performance of the fulfillment operation, using the training set of motion data. The training system 150 could then monitor an employee's actions while the employee performs the fulfillment operation using one or more motion capture devices, in order to collect an instance of motion data describing motion performed in carrying out the fulfillment operation. The training system 150 could divide the instance of motion data into a plurality of portions, using the first data model. For example, the training system 150 could determine a temporal window within the instance of motion data that corresponds to each of the sub-tasks for the fulfillment operation. The training system 150 could then generate a measure of quality for the instance of motion data, by analyzing the plurality of portions of the instance of motion data using the trained at least one data model.

As will be discussed in further detail below, the performance of the fulfillment operation can be assessed in a variety of different ways. In one embodiment, the training system 150 is configured to train a data model(s) to calculate an efficiency score for each of the sub-tasks and for each of multiple metrics. For example, the training system 150 could produce a report that evaluates the employee's performance of each sub-task on the metrics of ergonomics, safety, efficiency, quality, and task time analysis. In a particular embodiment where the employee is wearing an immersive reality headset (e.g., a virtual reality headset, an augmented reality headset, etc.), the training system 150 can render frames depicting an optimal motion for performing the fulfillment operation, using the trained data model. For instance, the training system 150 could render frames depicting a virtual avatar performing the optimal motion. Doing so enables the employee to visualize the optimal way of performing the task and to learn the optimal movement by mimicking the actions of the virtual avatar.

Figure 2:
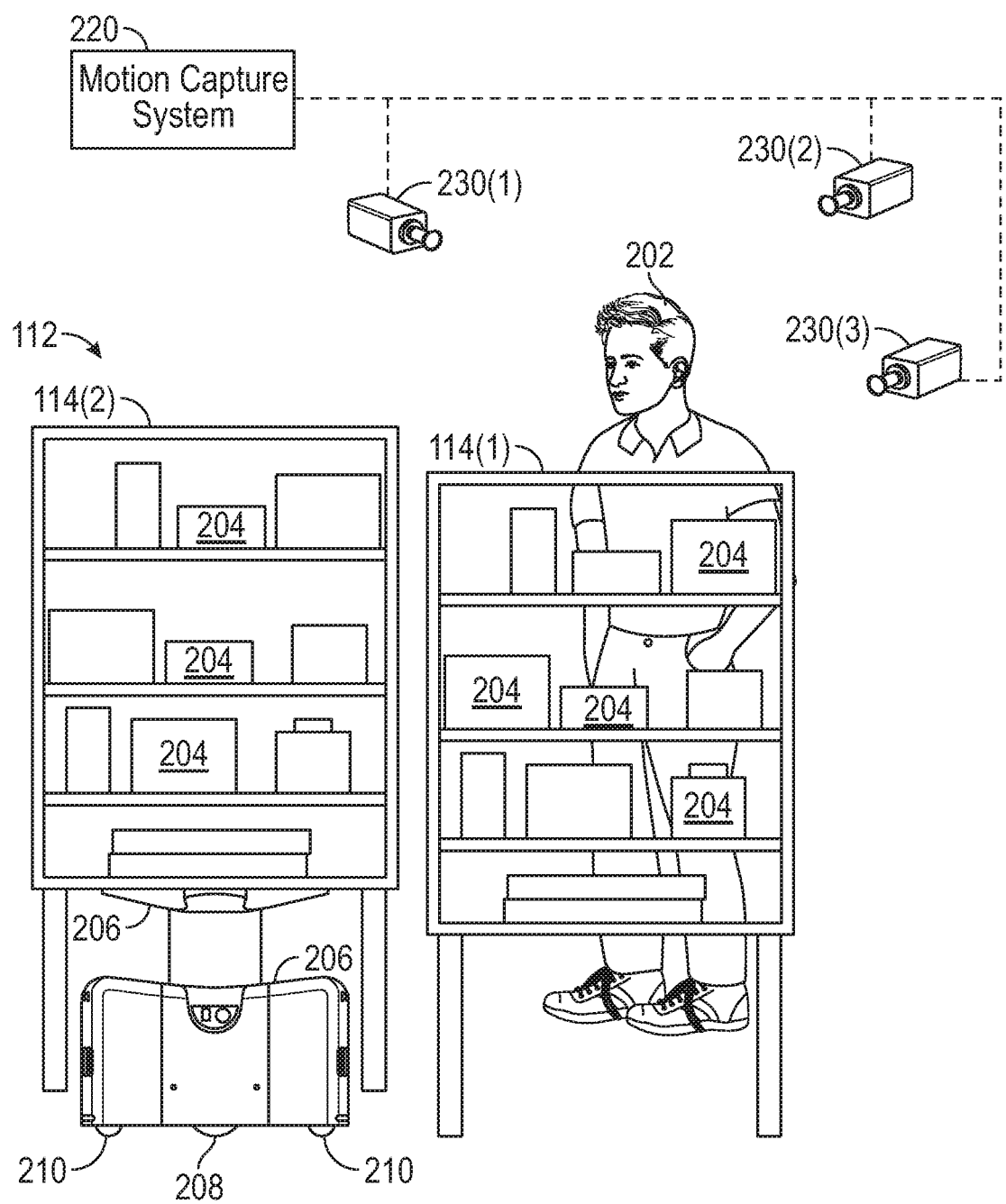
FIG. 2 shows a side view of a mobile drive unit and an inventory holder employed in the inventory system.

FIG. 2 illustrates a side-view illustration of a mobile drive unit 112 and inventory holders 114 employed in the inventory system 100. In this illustration, one inventory holder 114(1) is at rest in a first location next to a human picker 202. The inventory holder 114(1) has multiple shelves that support a variety of items 204. The inventory holder 114(1) has open side faces to facilitate stocking of the items 204 onto the shelves and picking of items from the shelves.

The inventory items 204 represent any objects suitable for storage, retrieval, and/or processing in an automated inventory system 100. For example, a given inventory item may represent a single stock-keeping unit (SKU) of a unique inventory item. Thus, inventory items may refer to a particular item and/or may refer to a quantity of items having a particular SKU as appropriate. As one example, the inventory system 100 may represent a retail distribution warehouse that stores bulk inventory items 204 for retail facilities, such as grocery stores and/or merchandise warehouses. As another example, the inventory system 100 may represent an e-commerce warehouse facility, and inventory items 204 may represent merchandise stored in the warehouse facility.

A mobile drive unit 112 is also shown moving a second inventory holder 114(2) into a second location next to the first location. The mobile drive unit 112 is positioning a second inventory holder 114(2) into a location for easy access by the picker 202 (such as at the inventory pier 102) or to place it in an on-deck location to be shuffled to the first location after the picker has completed picking items 204 from the first inventory holder 114(1) (such as at the pick station 104).

As shown, the mobile drive unit 112 is configured with multiple drive wheels 208 and stabilizer wheels 210. The drive wheels 208 could be driven using a motor that is within the body of the mobile drive unit 206 and which is in turn powered by a power source (not shown) within the body of the mobile drive unit 206.

FIG. 2 also includes a motion capture system 220, which is in communication with motion capture camera devices 230(1)-(3). Of note, while three motion capture camera devices are shown in FIG. 2, more generally the motion capture system 220 can be in communication and collect data from any number of motion capture devices. Additionally while motion capture camera devices are illustrated in FIG. 2, more generally any motion capture devices can be used to collect motion data from the user 202, consistent with the functionality described herein. For example, the user 202 could wear one or more wearable motion caption devices (e.g., a motion capture body suit, motion capture gloves, motion capture headwear, etc.) and the motion capture system 220 could communicate over a data communications network with such devices to collect motion data for the user 202.

Generally, the motion capture system 220 can monitor the movement of the user 202 using the motion capture camera devices 230(1)-(3) and can collect instances of motion data describing the movement of the user 202. In one embodiment, each instance of motion data describes the movement of the user 202 during a single instance of a fulfillment operation. For example, in the depicted embodiment, each instance of motion data can include motion capture sensor data for a single picking fulfillment operation. As discussed above, such a fulfillment operation can include a number of sub-tasks that are performed by the user 202.

Generally, the training system 150 can use the collected motion data for a number of different purposes. For example, where the user 202 is a top performing employee of the fulfillment center, the collected motion data could be used to train one or more data models for use in evaluating user performance of the fulfillment operation. Those trained data models can then be used as reference models against which to evaluate other motion data. For example, where the user 202 is a new employee undergoing training, the collected motion data could be analyzed using one of the already trained data model (e.g., derived from the motion data of the top performing employee) to evaluate the new user's performance. In doing so, the training system 150 could analyze the user's performance of each of the sub-tasks that make up the fulfillment operation (e.g., a picking operation) and can provide feedback to the user accordingly.

In one embodiment, the training system 150 is configured to collect motion data over a predetermined number of performances of the fulfillment operation, and to analyze the data as a whole to determine performance trends for the user. As an example, the training system 150 could analyze the motion data collected for the user 202 during performance of multiple fulfillment operations (e.g., 100 picking operations) and could determine that, for a substantial number of fulfillment operations, the user 202 was exhibiting unsafe bending and lifting behaviors, relative to the behaviors described in the trained data model. The training system 150 could provide such feedback to the user, so that the user can adjust his performance of the fulfillment operation going forward. In one embodiment, the training system 150 could determine a number of fulfillment operations during which the user exhibited the most unsafe behavior, and could provide a virtual depiction of the user's movement during those fulfillment operations to better help the user understand the problem. As an example, the training system 150 could apply the motion data collected by monitoring the user during the fulfillment operations where the user exhibited the most unsafe behavior to a virtual avatar, in order to reenact the user's unsafe behavior. Doing so not only informs the user of the problem, but helps the user visualize and better understand the unsafe behavior.

Figure 3:
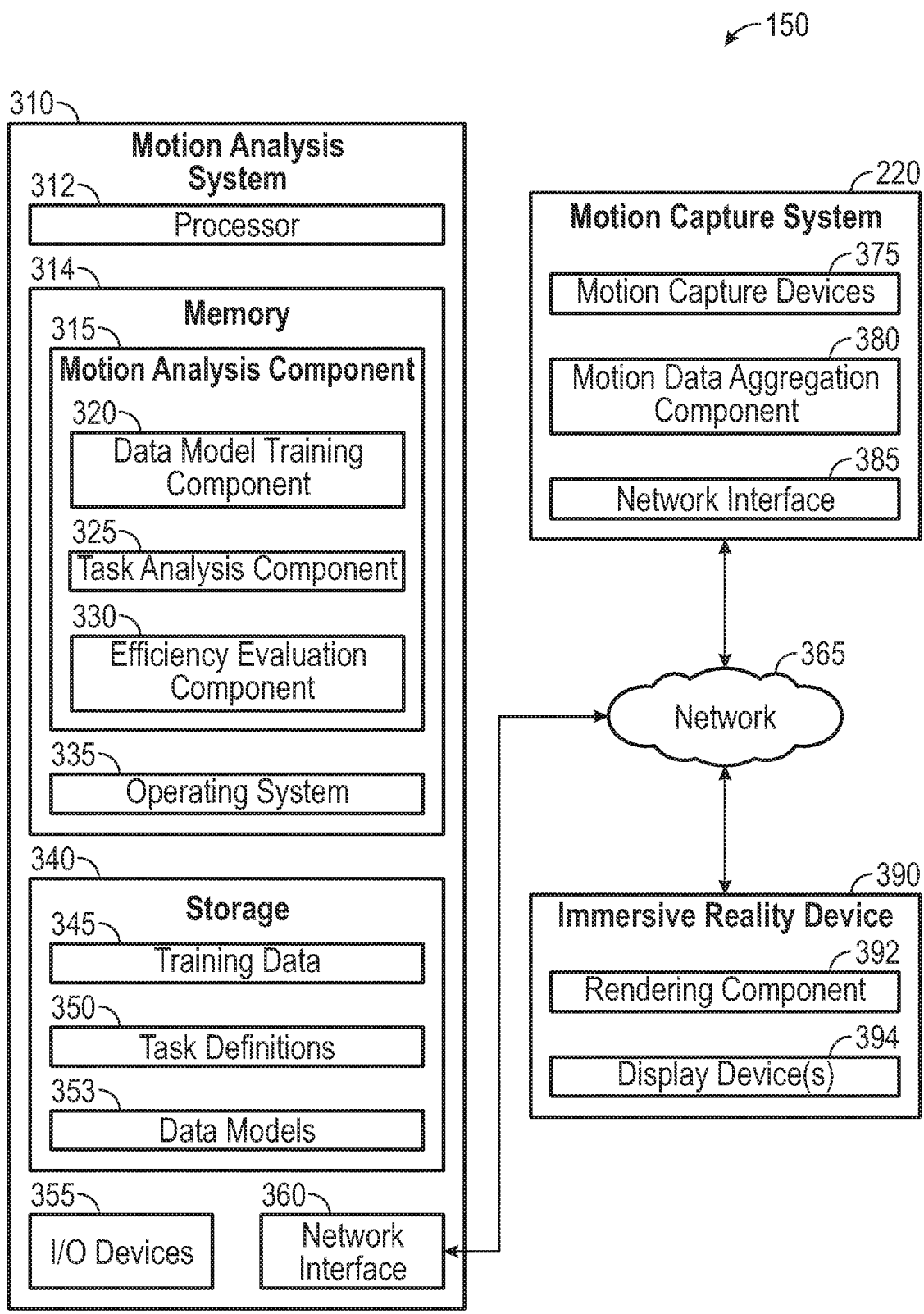
FIG. 3 is a block diagram illustrating a training system, according to one embodiment described herein.

FIG. 3 is a block diagram illustrating a training system, according to one embodiment described herein. As shown, the training system 150 includes a motion analysis system, the motion capture system 220 and an immersive reality device 390, interconnected via network 365. The motion capture system 220 includes motion capture devices 375, motion data aggregation component 380 and a network interface 385. Generally, the network interface 380 may be any type of network communications allowing the motion capture system 220 to communicate with other computers via a data communications network (e.g., network 365). The motion capture devices 375 generally represent any electronic devices capable of collecting data describing a user's motion over a window of time. For example, the motion capture devices 375 could be the motion capture cameras 230(1)-(3) shown in FIG. 2. Additionally, the motion capture devices 375 could include wearable motion capture devices (e.g., motion capture suits, gloves, headwear, and so on) that are configured with markers (e.g., reflective markers, active optical markers, etc.) that can easily be detected by the motion capture camera devices. In such an embodiment, the motion data aggregation component 380 could analyze the image data collected by the camera devices to generate motion data describing the user's movement over time.

In one embodiment, the motion capture devices 375 include an electromyography (EMG) sensor device that is configured to measure the electrical activity of the user's muscle tissue as the user performs the fulfillment operation. Such data could be analyzed (e.g., by the motion analysis component 315) to determine which muscles a user is activating while performing various sub-tasks of a fulfillment operation. As an example, the motion analysis component 315 could consider such data in determining an ergonomics metric score for the user's performance of a given sub-task, where a user may get a higher ergonomics score when lifting a package predominantly using his leg muscles (e.g., as indicated by the collected EMG sensor data) and a lower ergonomics score when lifting a package predominantly using the muscles in his lower back.

The motion analysis system 310 includes a processor 312, memory 314, storage 340, I/O devices 355, and a network interface 360. Processor 312 is intended to be representative of a single CPU, multiple CPUs, a single CPU having multiple processing cores, and the like. The memory 314 is included to be representative of a random access memory.

As shown, memory 314 includes a motion analysis component 315 and an operating system 335. The motion analysis component 315 includes a data model training component 320, a task analysis component 325 and an efficiency evaluation component 330. Storage 340 includes training data 345, task definitions 350, and data models 353. The storage 340 may be a disk drive storage device. Although shown as a single unit, the storage 340 may be a combination of a fixed and/or removable storage, such as fixed disc drives, removable memory cards, optical storage, network attached storage (NAS), or storage-area-network (SAN). The network interface 360 may be any type of network communications allowing the motion analysis system 310 to communicate with other computers via a data communications network (e.g., network 365).

The training data 345 represents data collected for use in training the data models 353. Such training data 345 can include motion data collected by monitoring employees performing a fulfillment operation (e.g., a picking operation, a stow operation, etc.) within a fulfillment environment (e.g., a distribution warehouse). In one embodiment, the training data 345 includes both positive examples of performing the fulfillment operation (e.g., data collected by monitoring employees performing the fulfillment operation in an optimal fashion) and negative examples of performing the fulfillment operation (e.g., data collected by monitoring employees performing the fulfillment operation incorrectly). In one embodiment, whether a given instance of motion data is a positive or negative example can be explicitly specified (e.g., by an administrator of the motion analysis system 310). For example, when initially building the data models 353, positive samples of motion data could be collected from top performing employees, while negative samples of motion data could be collected from employees intentionally performing certain sub-tasks incorrectly (e.g., purposefully moving slowly, purposefully using poor lifting technique, and so on).

In a particular embodiment, the data model training component 320 can classify the instances of motion data within the training data 345 as either positive or negative examples, based on an employee history of the user that was monitored to collect the instance of motion data. For example, the data model training component 320 could analyze data describing a particular user's employment history within the fulfillment center and could determine that the particular user has always received excellent performance reviews and the user's performance has otherwise been rated very highly within the fulfillment center. As a result, the data model training component 320 could deem all instances of motion data collected for the particular user as positive examples. Likewise, for another user who has exhibited a historically poor performance within the fulfillment center, the motion analysis component 315 could deem instances of motion data collected for the other user as negative examples.

Generally, the data model training component 320 can use the positive and negative samples of motion data within the training data 345 to train one or more data models 353 to evaluate an instance of motion data, in order to determine whether the instance of motion data represents an optimal performance of a fulfillment operation. For example, the data model training component 320 could use the training data 345 to train a machine learning classifier data model 353 that maps motion data collected during the performance of a fulfillment operation to measures of quality. In a particular embodiment, at least one of the machine learning data models 353 is generated according to a regression algorithm and is configured to generate a performance score that represents an estimated measure of user performance for a given metric and for a given sub-task of a fulfillment operation.

The data models 353 can represent any form of machine learning or deep learning models, consistent with the functionality described herein. Examples of such machine learning and deep learning algorithms include, without limitation, Naïve Bayes classification, Logistic regression models and classifiers, Decision Tree regression models and classifiers, Support Vector Machine (SVM) classifiers, and so on. Additional example include neural network classifiers and regression models (including deep neural network classifiers and regression models), Decision Forest classifiers and regression models, Perceptron classifiers, Linear and Bayesian linear regression models, and Bayes point machine classifiers. More generally, any suitable machine learning model, known or unknown, can be used, consistent with the functionality described herein.

The task definitions 350 generally represent the predefined sub-tasks that make up a fulfillment operation. For example, the task definitions 350 for a picking operation could include the tasks of (i) logging into a station, (ii) selecting the pick workflow, (iii) scanning an empty tote, (iv) confirming the tote location in the tote rack, (v) waiting on the inventory holder to arrive, (vi) fetching an item from a bin on the inventory holder, (vii) scanning the item and (viii) putting the item in the tote and press a lighted button on the tote rack. As another example, the task definitions 350 for a stow operation could include (i) logging into a station, (ii) selecting the stow workflow, (iii) waiting on the inventory holder to arrive, (iv) scanning a container, (v) picking a product out of the container, (vi) identifying a target bin for the product on the inventory holder, (vii) making room for the product and placing the product in the bin, and (viii) scanning the bin. Such a workflow could be repeated for multiple products by, for example, returning to step (iv) and scanning another container.

In one embodiment, the task definitions 350 further specify an ordering for the specified tasks. For example, the task definitions 350 could specify that the aforementioned tasks for a particular picking operation must be performed in sequential order from (i) to (viii). In a particular embodiment, the task definitions can specify 350 that two or more of the specified tasks can optionally be performed in any order relative to one another. As an example, in the aforementioned stow operation, an exemplary task definition 350 could specify that the tasks of placing the product in the bin and scanning the bin could optionally be performed in any order, relative to one another. In such an embodiment, the data models 353 may be trained to learn an optimal ordering for performing the tasks, based on positive samples within the training data 345.

In a particular embodiment, the efficiency evaluation component 330 is configured to detect when the user has not performed one or more of the tasks defined by the task definitions 350 for a given fulfillment operation. For example, the efficiency evaluation component 330 could perform a pattern matching analysis for each of the tasks for the fulfillment operation to determine whether a portion of an instance of motion data collected by monitoring a user matches a predefined pattern of motion data for a given task. If the efficiency evaluation component 330 determines that no portion of the instance of motion data sufficiently matches the predefined pattern (e.g., based on a confidence value for the best matching portion not exceeding a predefined threshold), the efficiency evaluation component 330 could determine that the user has omitted one of the tasks for the fulfillment operation. The efficiency evaluation component 330 could then provide feedback to the user, e.g., informing the user that the task was omitted. In one embodiment, the efficiency evaluation component 330 is configured to depict the optimal performance of the omitted task using the immersive reality device 390, so that the user can better understand how to correct his performance of the fulfillment operation.

Generally, the motion analysis component 315 is configured to receive motion data describing a user's movement during the performance of a fulfillment operation and to provide evaluation results and/or feedback on how well the user performed the operation. For example, the motion analysis component 315 could receive an instance of motion data describing motion performed in carrying out a fulfillment operation. The efficiency evaluation component 330 could analyze the instance of motion data using at least one data model trained with historically collected motion data. For example, such data model(s) could be trained by the data model training component 320 using the training data 345. The efficiency evaluation component 330 could then determine a measure of quality for the instance of motion data, based on the analysis.

In one embodiment, the efficiency evaluation component 330 is configured to provide feedback on the user's performance of the fulfillment operation using the immersive reality device 390. The immersive reality device 390 could represent, for example, an augmented reality or a virtual reality headset. As shown, the immersive reality device 390 includes a rendering component 392 and one or more display devices 394. For example, the efficiency evaluation component 330 could determine that the user performed a particular sub-task poorly (e.g., where the measure of quality calculated for the sub-task is less than a predefined threshold level of quality) and, in response, could transmit instructions to the rendering component 392 to generate a graphical depiction of the user's movement in performing the sub-task. In doing so, the efficiency evaluation component 330 could transmit a temporal chunk of motion data corresponding to the user's performance of the sub-task in question to the immersive reality device 390, and the rendering component 392 could render frames depicting the motion data being applied to a virtual avatar (e.g., an avatar that is configured with movement constraints that depict the realistic movement of human limbs and joints). The rendered frames could then be output using the display device(s) 394, so that the user see how he performed the sub-task and better understand why his performance was sub-optimal.

In one embodiment, the rendering component 392 is configured to render frames depicting a virtual avatar performing the sub-task in an optimal manner. Such an optimal manner could be learned, for example, by combining (e.g., averaging) all of the positive samples of motion data for performing the sub-task in the training data 345. The rendering component 392 could apply such optimal motion data to a virtual avatar (e.g., having predefined human joints and predefined joint movement constraints to depict realistic human movement) to depict the avatar performing the sub-task in the optimal manner.

In a particular embodiment, the rendering component 392 could also apply the motion data collected by monitoring the user perform the sub-task to a second avatar (e.g., also having the predefined human joints and joint movement constraints) and could render frames depicting the second avatar performing the user's movement. By doing so, the training system 150 can visualize how the user's behavior differs from the optimal behavior of a user performing the sub-task. In one embodiment, the rendering component 392 renders the first avatar and the second avatar together (e.g., adjacent to each other, overlayed on top of each other, etc.), so that the user can directly visualize the differences between the two movements.

Figure 4A:
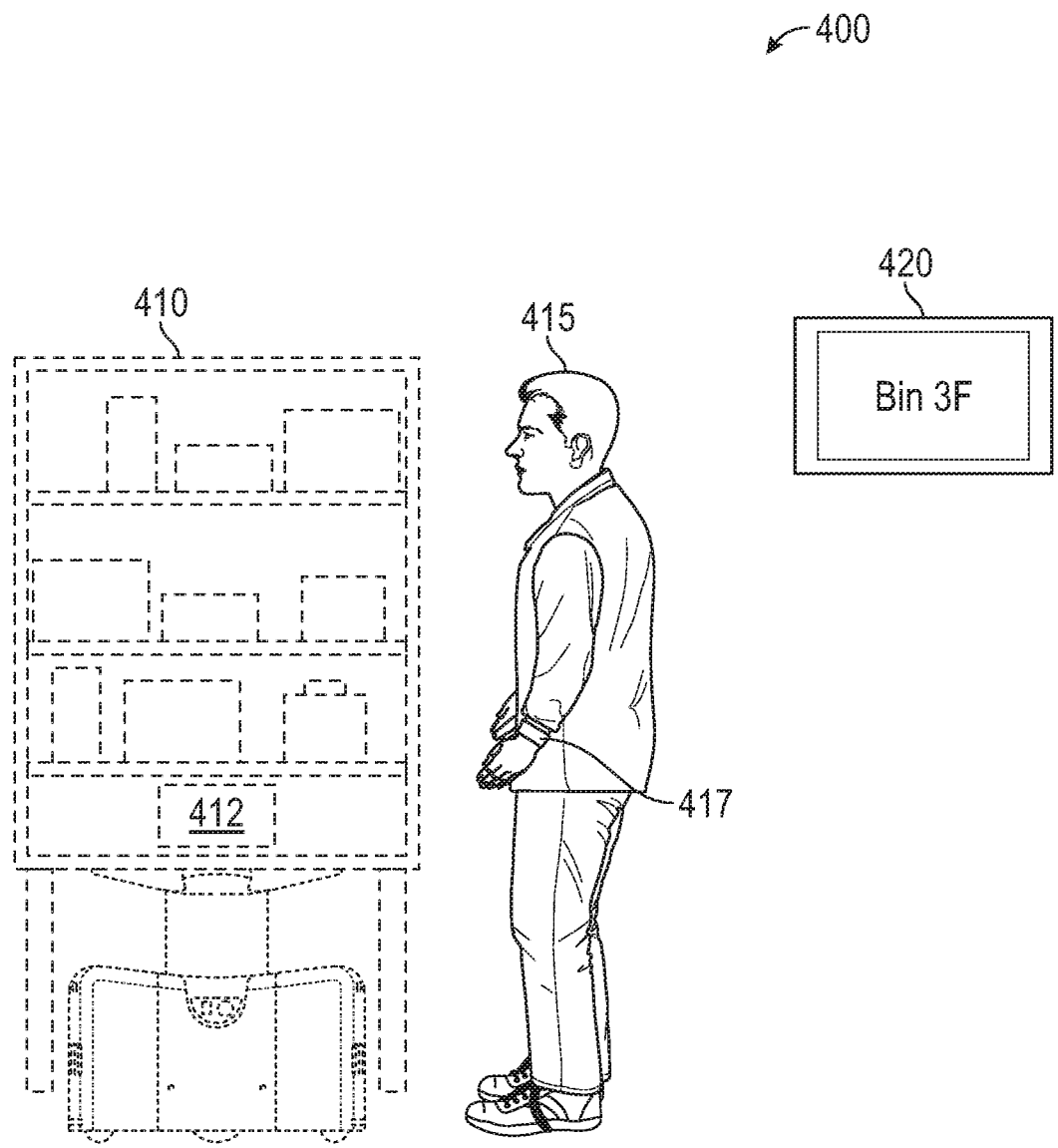
FIG. 4A-D illustrate a user performing a fulfillment operation, according to embodiments described herein.

FIG. 4A-D illustrate a user performing a fulfillment operation, according to embodiments described herein. As shown in FIG. 4A, the environment 400 includes an inventory holder on a mobile drive unit 410 that is shown in dashed lines to indicate the inventory holder has not yet arrived, a user 415 and a display device 420. The inventory holder 410, when it arrives, will contain a product 412. The user 415 is configured with a motion capture device 417. In the depicted example, the motion capture device 417 is shown as a wrist band which may contain one or more indicators (e.g., reflective indicators, active illuminated indicators, etc.) which can be easily detected by one or more motion capture camera devices (not shown). While the motion capture device 417 is illustrated as a wrist band in the environment 400, more generally any motion capture device(s) may be used to capture data describing the user's 415 motion, consistent with the functionality described herein.

In one embodiment, the motion capture device 417 comprises an EMG sensor device that is configured to collect electromyography data describing muscle activations of the user 415. In a particular embodiment, the motion capture device 417 represents an ultrasonic device as described in U.S. patent application Ser. No. 15/083,083, entitled "ULTRASONIC BRACELET AND RECEIVER FOR DETECTING POSITION IN 2D PLANE," which is hereby incorporated by reference in its entirety. In such an embodiment, the motion capture device 417 could emit ultrasonic pulses that can be detected by three or more ultrasonic transducers (not shown) within the fulfillment environment. A management module could then determine a set of location coordinates (e.g., X, Y and Z) corresponding to the three-space position of the motion capture device 417 worn by the user, based on time differentials when an ultrasonic pulse was emitted by the motion capture device 417. The respective set of coordinates corresponding to each emitted ultrasonic pulse could then be tracked over a period of time to determine motion data describing the user's movement while performing a fulfillment operation. More generally, any sort of sensor device(s) suitable for user in collecting data describing the user's movement during performance of a fulfillment activity could be used, consistent with the functionality described herein.

Figure 4B:
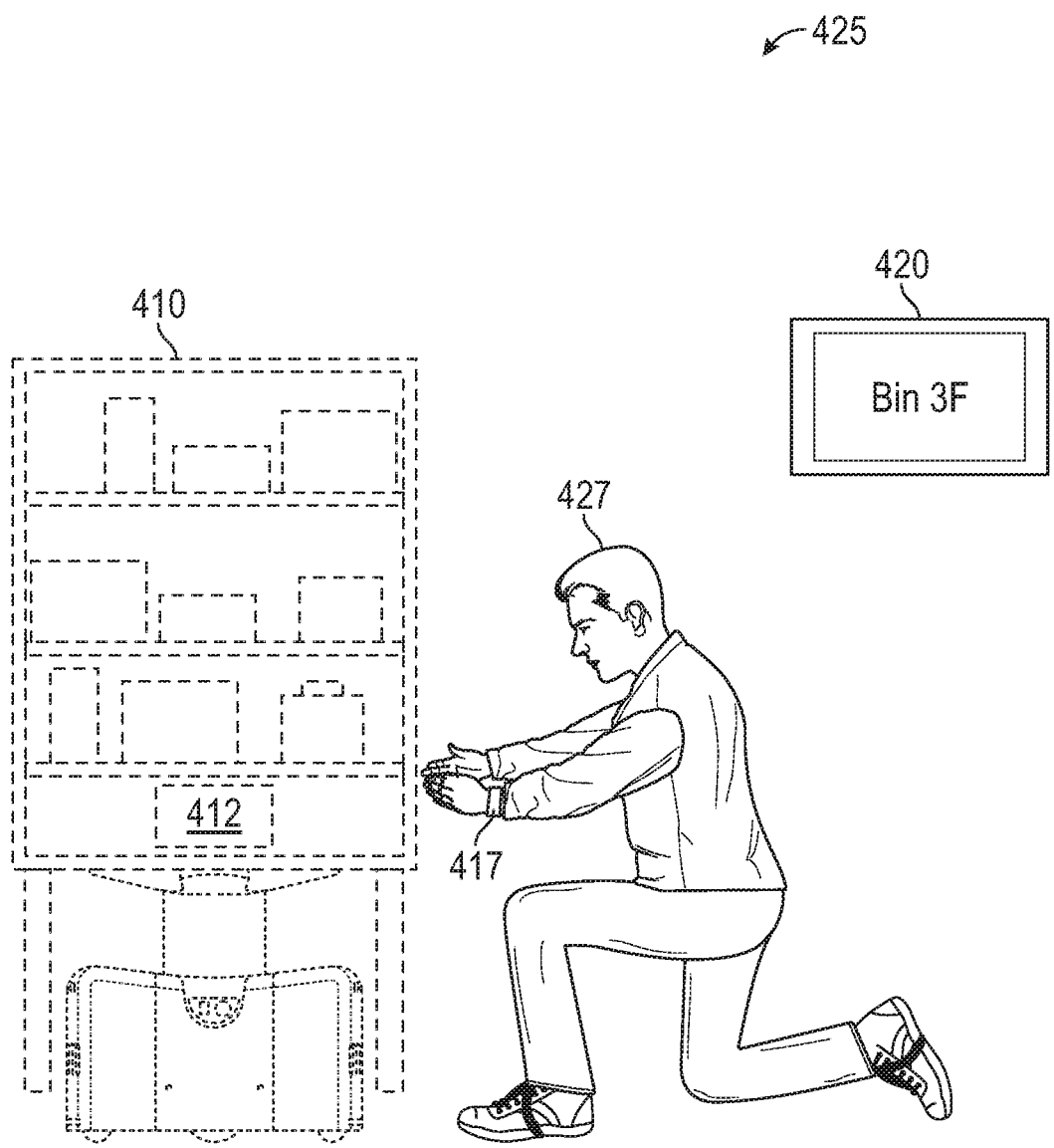

In the depicted example, the display screen 420 is depicting a graphical user interface (GUI) that indicates that, when the inventory holder 410 arrives, the product 412 will be in bin 3F. For purposes of this example, assume that bin 3F refers to a bin on the middle, bottom shelf of the inventory holder 410. In this example, as the user 415 sees that the product 412 will be on a bottom shelf once the inventory holder 410 arrives, the user 415 could perform an optimal behavior and could get into position to retrieve the product 412, once the inventory holder 410 arrives. As such, as shown in FIG. 4B, the environment 425 depicts the user 427 in a kneeling position, awaiting the arrival of the inventory holder 410. As discussed above, while the optimal behavior of getting into position before the inventory holder 410 arrives may save an amount of time that is not noticeable to the user (e.g., seconds, if not a fraction of a second), such a time savings can be significant when viewed across all fulfillment operations performed by all employees in all fulfillment centers for a business.

Figure 4C:
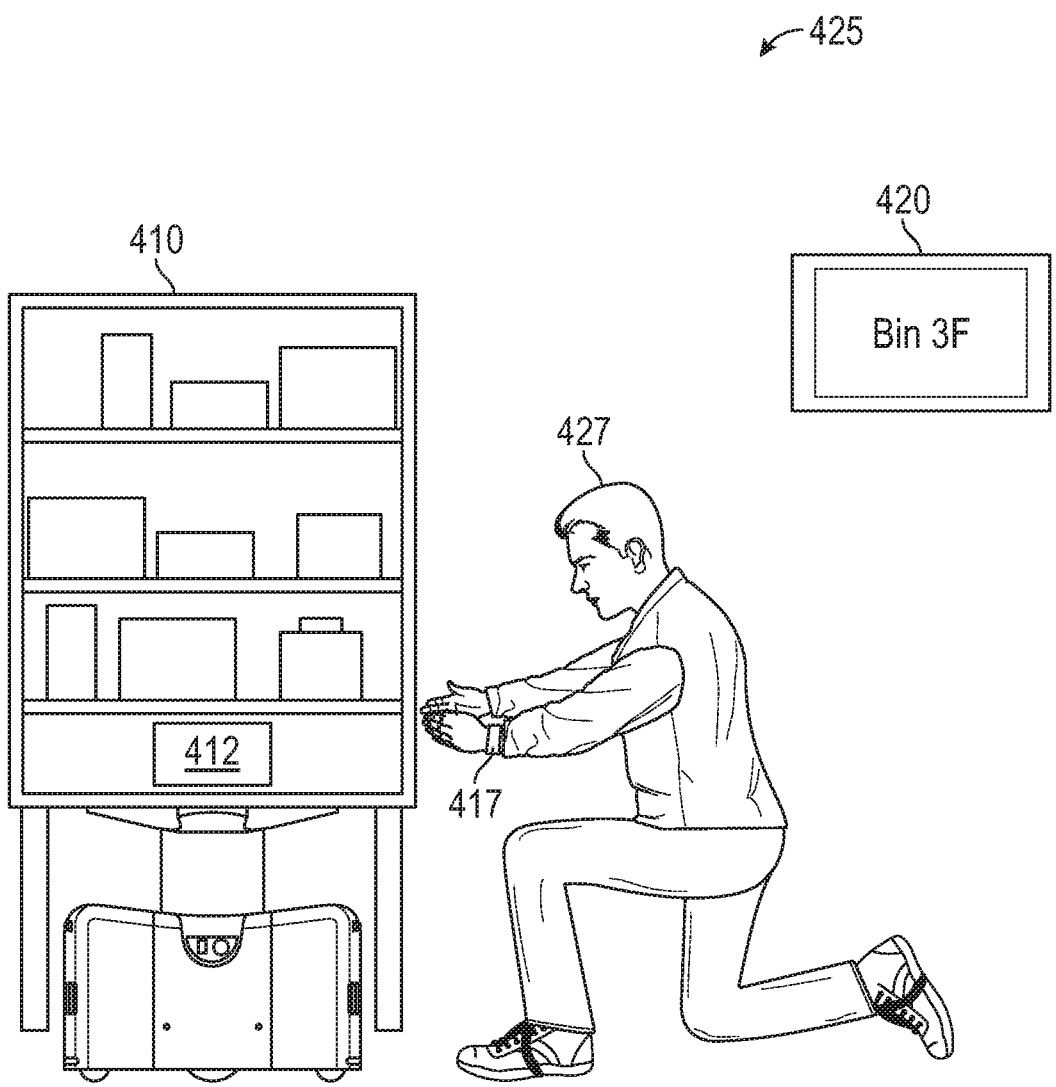
Figure 4D:
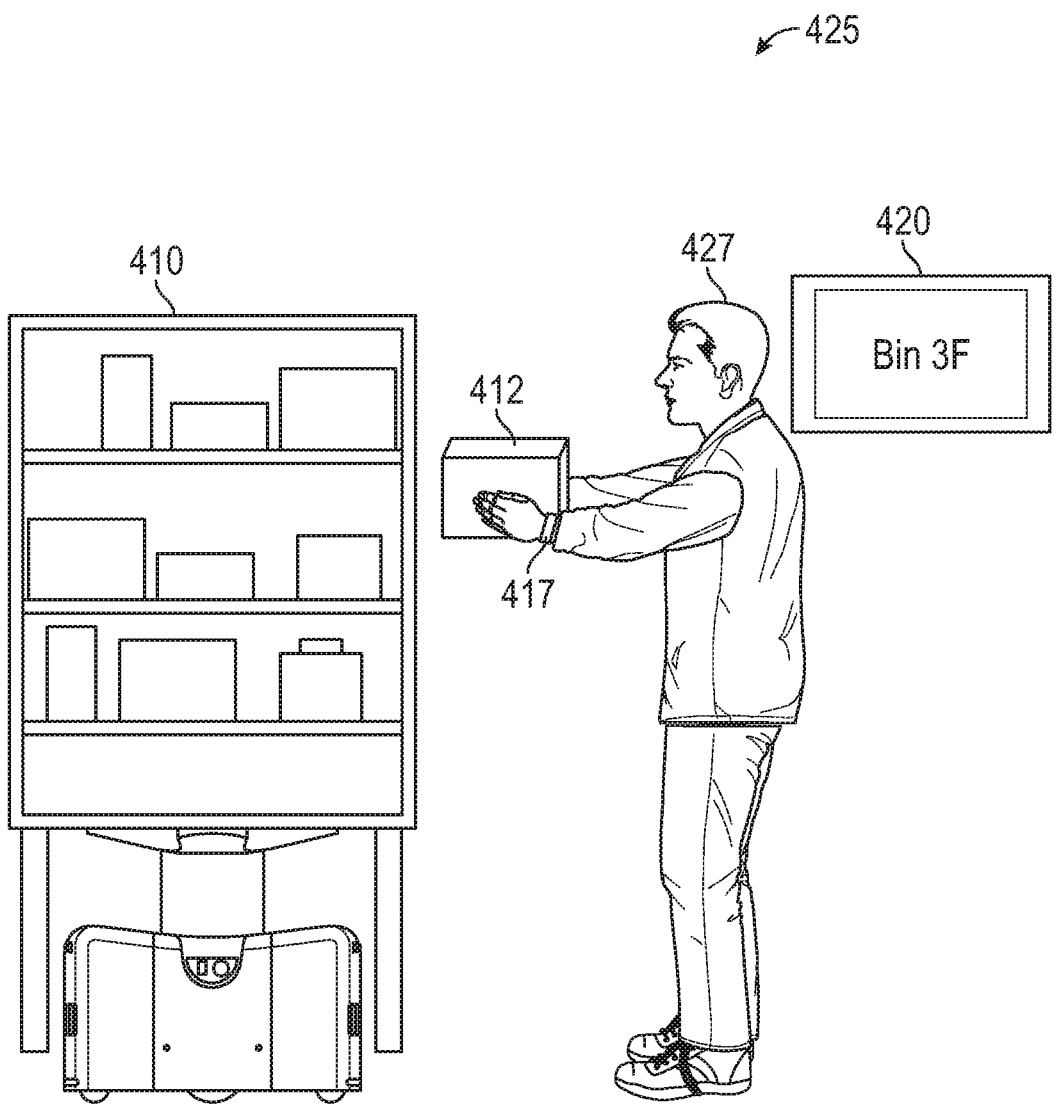

FIG. 4C depicts the arrival of the inventory holder 410, which is now shown in solid lines. As previously mentioned, as the user 427 is already in position to retrieve the item 412 from the Bin 3F, the user can more quickly retrieve the item 412 from the inventory holder 410. FIG. 4D depicts the user 427 now in a standing position holding the item 412, and ready to continue with the remainder of the sub-tasks that make up the fulfillment operation.

For purposes of this example, assume that the user movement shown in FIG. 4A-D represents a highly optimal movement for performing the fulfillment operation, in terms of one or more metrics (e.g., efficiency of movement, ergonomics of movement, time taken to complete the task, etc.). The motion capture system 220 could monitor the movement of the user across the examples shown in FIG. 4A-D and could collect data describing the user's motion using motion capture devices 375. For example, motion capture cameras could be placed throughout the fulfillment environment to capture images of the user as the user performs the fulfillment operation. The motion data aggregation component 380 could analyze the images and could track the movement of one or more markers on the wearable motion capture device 417, as the user performs the fulfillment operation. The motion data aggregation component 380 could then generate an instance of motion data describing the user's movement.

Generally, this process could be performed for multiple different iterations of the fulfillment operation. The collected instances of motion data could be transmitted to the motion analysis component 315 (e.g., using the network 365) for use in generating one or more data models for analyzing motion data. For example, the data model training component 320 could use the collected instances of motion data as positive examples for training one or more of the data models 353.

In one embodiment, the task analysis component 325 is configured to divide each instance of collected motion data into a plurality of temporal portions, where each temporal portion corresponds to a respective sub-task defined by the task definitions 350. The data model training component 320 could then train a respective one of the data models 353 for each of the sub-tasks, using the corresponding temporal portions of motion data.

The motion analysis component 315 could use the trained data models 353 for training and evaluation of employees performing the fulfillment operation. For example, the motion analysis component 315 could determine an optimal movement for performing the fulfillment operation under particular conditions (e.g., when the item to be retrieved is located in Bin 3F) using the collected instances of motion data. The motion analysis component 315 could then transmit data describing the optimal movement to the immersive reality device 390. Upon receiving the data, the rendering component 392 could apply the optimal movement data to a virtual avatar and could render one or more frames for display on the display device(s) 394, depicting the virtual avatar performing the fulfillment operation under the particular conditions in the optimal manner. Doing so enables employees to visualize how the fulfillment operation can be performed in a more effective manner, which can assist in training new employees and improving the performance of existing employees.

As another example, the trained data models 353 could be used to evaluate a particular employee's performance of the fulfillment operation. For example, the motion capture system 220 could collect motion data using the motion capture devices 375 while the particular employee performs the fulfillment operation, and an instance of motion data could be generated by the motion data aggregation component 380 and transmitted to the motion analysis component 315 for analysis. The task analysis component 325 could divide the instance of motion data into a plurality of temporal portions based on the sub-tasks defined by the task definitions 350, and the efficiency evaluation component 330 could analyze each temporal portion using a data model 353 trained to evaluate motion data for the corresponding sub-task of the fulfillment operation. The efficiency evaluation component 330 could then generate a respective quality score for each of the plurality of sub-tasks, by analyzing a respective one of the plurality of portions using a corresponding one of the plurality of data models. The efficiency evaluation component 330 could provide an evaluation report to the particular user to help the user better understand his strengths and where his performance needs improvement.

Figure 5:
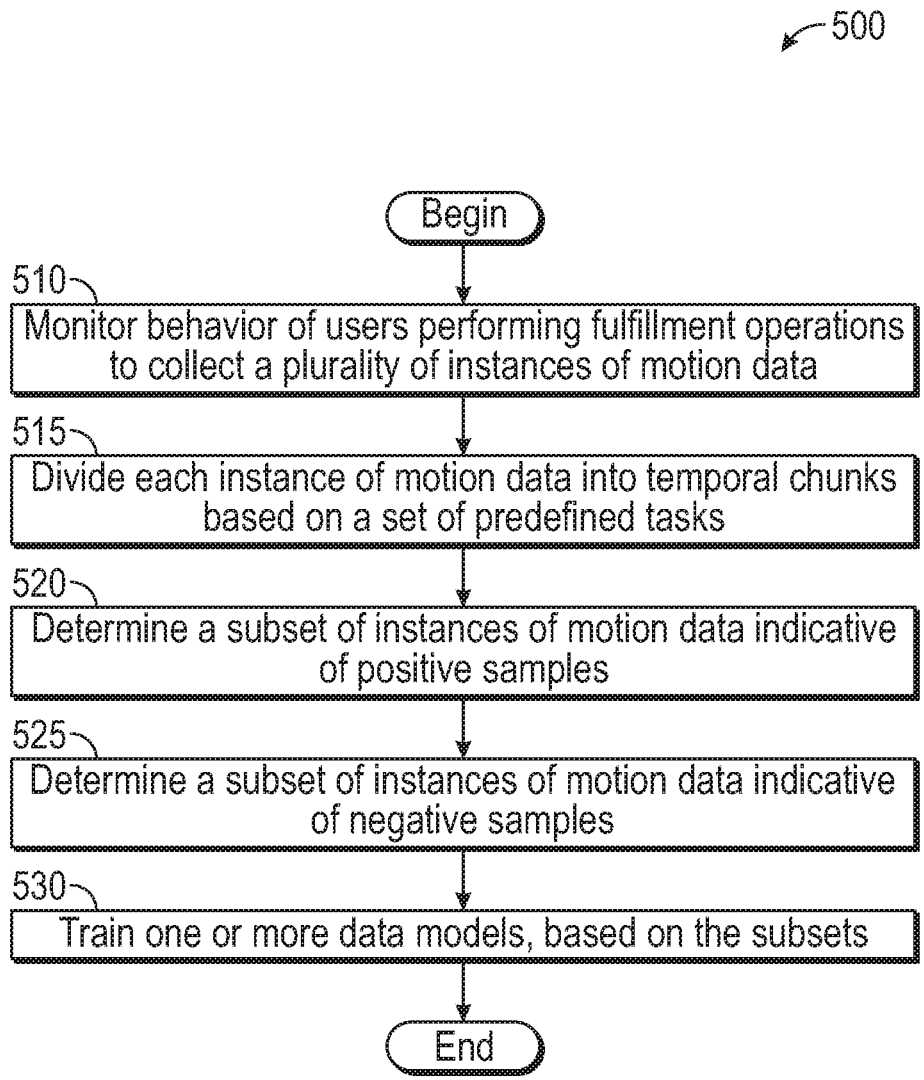
FIG. 5 is a flow diagram illustrating a method of training a data model to assess the performance of a fulfillment operation, according to one embodiment described herein.

FIG. 5 is a flow diagram illustrating a method of training a data model to assess the performance of a fulfillment operation, according to one embodiment described herein. As shown, the method 500 begins at block 510, where a motion capture system 220 monitors behavior of users performing fulfillment operations within a fulfillment environment to collect a plurality of instances of motion data. In doing so, the motion capture system 220 can collect data from a plurality of motion capture devices 375, such as motion capture camera devices, wearable motion capture equipment and so on. The plurality of instances of motion data can be transmitted to a motion analysis system 310 for use in training the one or more data models.

A task analysis component 325 can divide each instance of motion data into a plurality of temporal chunks, based on a set of predefined tasks specified in the task definitions 350 (block 515). For example, the task analysis component 325 could determine that a portion of a first instance of motion data from time $T_1$ to time $T_2$ corresponds to a first sub-task of the fulfillment operation, a second portion of data from time $T_2$ to time $T_3$ corresponds to a second sub-task, and so on. In one embodiment, the task analysis component 325 is configured to train a machine learning classifier to analyze an instance of motion data and to determine the temporal chunks that correspond to the sub-tasks of the fulfillment operation. For instance, an administrator could provide a number of positive samples of manually divided instances of motion data captured from users performing the fulfillment operation and the task analysis component 325 could use such information to train the machine learning classifier to divide subsequent instances of motion data into temporal chunks corresponding to the set of predefined tasks.

The data model training component 320 determines a subset of the plurality of instances of motion data that are indicative of positive samples (block 520), and further determines a subset of the plurality of instances of motion data that are indicative of negative samples (block 525). For example, an administrator could manually designate each of the plurality of instances of motion data as either a positive sample or a negative sample. As another example, the data model training component 320 could be configured to determine whether a given instance of motion data is a positive sample or a negative sample, based on attributes of the user from which the instance of motion data was collected. For example, the data model training component 320 could access data describing the user's performance history within the fulfillment center and upon determining that the user has historically received very positive performance reviews, could consider the data collected from monitoring the user as a positive sample.

The data model training component 320 then trains one or more data models, using the determined subsets (block 530), and the method 500 ends. For instance, the data model training component 320 could train a neural network to evaluate instances of motion data in order to rate the performance of the user from which the motion data was collected. For example, such a neural network could receive as inputs the temporal chunks of motion data corresponding to the set of predefined sub-tasks, and could output one or more measures of quality describing how well the user performed each sub-task, relative to the provided positive samples of motion data. In a particular embodiment, the data model training component 320 is configured to train a neural network to output multiple measures of quality for each of the sub-tasks, e.g., a rating of how ergonomically the task was performed, a rating of how safely the task was performed, a rating of how efficiently the task was performed, etc.

In one embodiment, the data model training component 320 further trains the one or more data models using attributes of the monitored fulfillment operations. Such attributes could include, for example, which bin of an inventory holder is specified for stowing an item for a given fulfillment operation. Additionally, the attributes could include one or more system events corresponding to the fulfillment operation. As an example, a sensor event could be generated when the user scans a particular bin using a scanning device as part of a task in performing a fulfillment operation. As another example, a sensor device(s) (e.g., a motion detection sensor) could be configured to monitor each of the bins of an inventory holder and, upon detecting motion within a given bin (e.g., resulting from a user stowing a product in the bin), could generate a sensor event specifying the bin. As yet another example, a system event could be generated during the performance of a fulfillment operation specifying a type of the product being retrieved or stowed (e.g., a garment, a small box, a large box, etc.). The data model training component 320 could use such information when training the model to provide a context for the instances of motion data. That is, the optimal movement for performing a given fulfillment operation can vary, depending on various attributes, and such information can be used in training the data model(s) to provide a more accurate and reliable evaluation of user movement. As an example, the optimal motion for retrieving a garment from a top bin of an inventory holder could differ substantially from the optimal motion for retrieving a large, heavy box from a bottom bin of the inventory holder.

Figure 6:
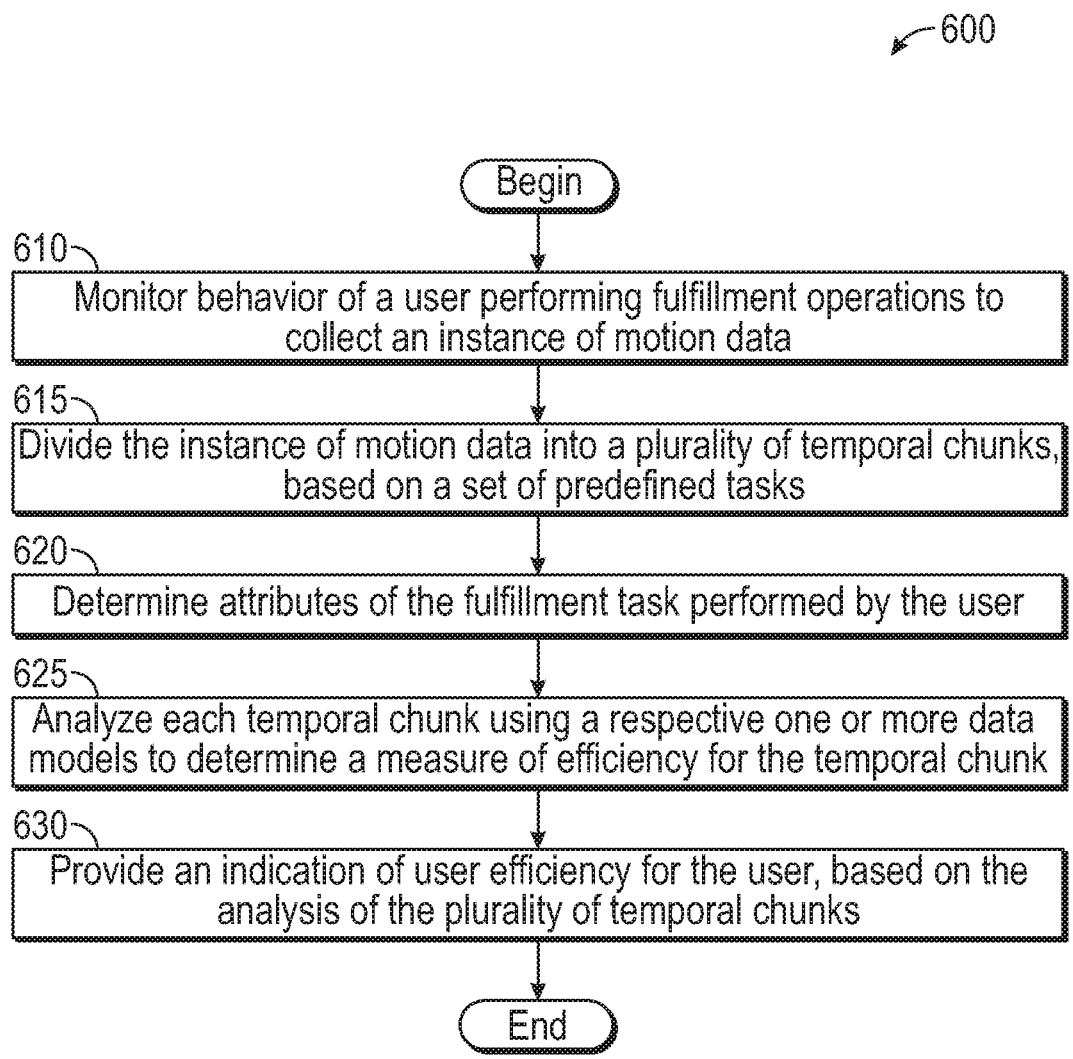
FIG. 6 is a flow diagram illustrating a method of evaluating user efficiency in performing a fulfillment operation, according to one embodiment described herein.

FIG. 6 is a flow diagram illustrating a method of evaluating user efficiency in performing a fulfillment operation, according to one embodiment described herein. The method 600 begins at block 610, where the motion capture system 220 monitors behavior of a user performing a fulfillment operation in order to collect an instance of motion data. As discussed above, the motion capture system 220 could monitor the user's behavior using motion capture devices 375, such as motion capture camera devices, wearable motion capture equipment, and so on.

The task analysis component 325 divides the instance of motion data into a plurality of temporal chunks, based on a set of predefined sub-tasks that make-up an iteration of the fulfillment operation (block 615). As discussed above, the task analysis component 325 could analyze the instance of motion data using a trained data model(s) to determine the temporal chunk that corresponds to each of the sub-tasks. Additionally, the efficiency evaluation component 330 determines attributes of the fulfillment task that was performed by the user when the instance of motion data was collected (block 620). For example, such attributes could specify, for example, which bin of an inventory holder contains an item to be retrieved as part of a pick fulfillment operation. Such information can be relevant, for instance, in determining the optimal movement of the user in retrieving the item, as the user's movement can differ dramatically when retrieving an item from a top bin of the inventory holder as opposed to retrieving an item from a bottom bin of the inventory holder.

In the depicted embodiment, the efficiency evaluation component 330 analyzes each temporal chunk using a respective one or more data models to determine a measure of efficiency for the temporal chunk (block 625). In one embodiment, the efficiency evaluation component 330 analyzes the temporal chunks using a neural network that is configured to output one or more scores for one or more metrics for each of the temporal chunks. For example, in a particular embodiment, such a neural network is configured to output, for each of the temporal chunks, an ergonomics score, a safety score, an efficiency score, a quality score and a task time analysis score. In one embodiment, the efficiency evaluation component 330 is configured to use a respective one or more machine learning data models to analyze temporal chunks for each of the plurality of sub-tasks. For example, for a sub-task that requires the employee to pick a product out of a container, the efficiency evaluation component 330 could analyze the temporal chunk of motion data corresponding to the sub-task using a respective one or more machine learning models that are configured to analyze motion data for the specific sub-task according to one or more metrics. In a particular embodiment, the efficiency evaluation component 330 is configured to use a respective machine learning model for each metric and for each sub-task when analyzing the temporal chunks of motion data.

Returning to the depicted embodiment, the efficiency evaluation component 330 provides an indication of user efficiency for the user, based on the analysis of the temporal chunks (block 630), and the method 600 ends. In a particular embodiment, the efficiency evaluation component 330 is configured to output an evaluation summary report that reflects the results of the analysis. FIG. 7 illustrates one such evaluation summary report, according to one embodiment described herein. As shown, the report 700 contains a respective score for each sub-task of a picking fulfillment operation and for each of a plurality of metrics. In the depicted example, the efficiency evaluation component 330 has analyzed the temporal chunk of motion data for each of the sub-tasks according to the metrics of ergonomics, safety, efficiency, quality and task time analysis. Based on such a report, a user reviewing the report could determine that while the monitored user was highly efficient when performing the sub-task of making room for the product and placing the product in a bin of an inventory holder, the monitored user demonstrated relatively poor ergonomics and safety when performing the sub-task. For example, such scores may be the result of the bending over too quickly in a manner that could potentially injure the monitored user's back. Of note, while the scores in the depicted example are on a scale of 1 to 100, more generally any technique for evaluating the user's performance of a sub-task according to a given metric can be used, consistent with the functionality described herein. Examples of such scoring systems include, without limitation, other numeric scoring schemes, letter grades (e.g., A, B, C, D, or F), categories (e.g., Exceptional, Satisfactory, Needs Improvement) and so on.

Figure 8A:
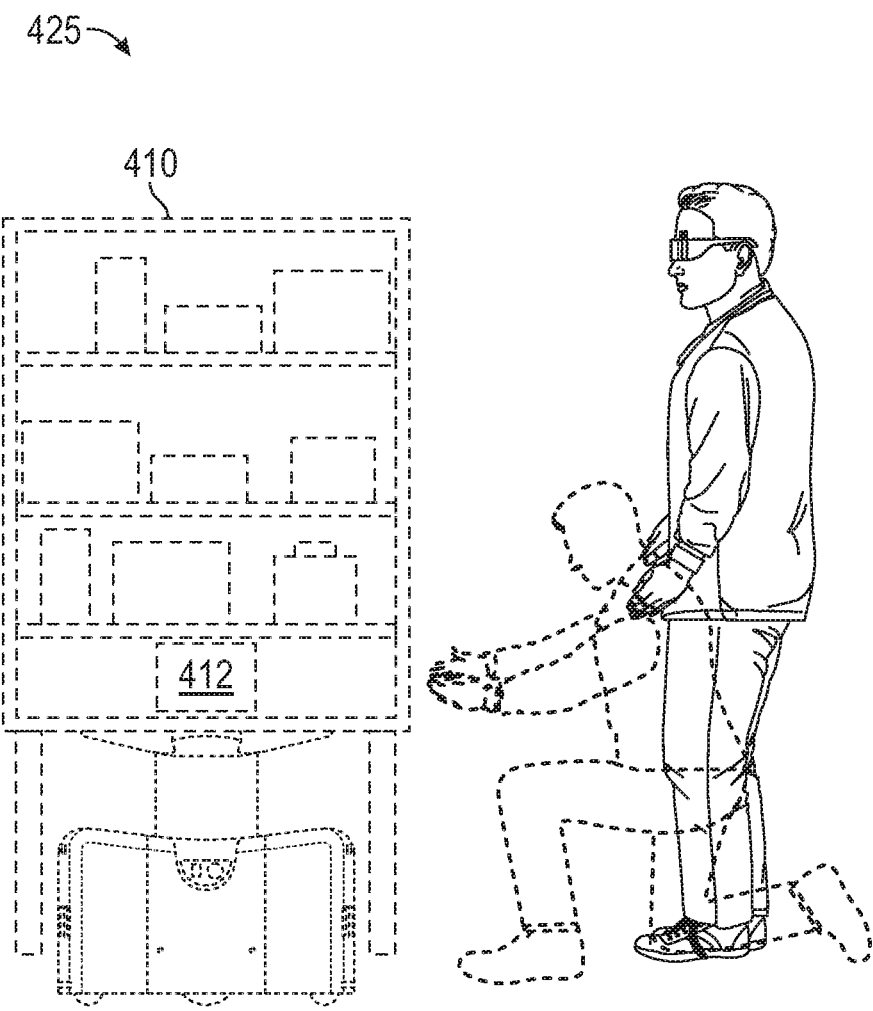
FIG. 8A-B illustrate an augmented reality environment that includes a virtual avatar performing a fulfillment operation, according to one embodiment described herein.
Figure 8B:
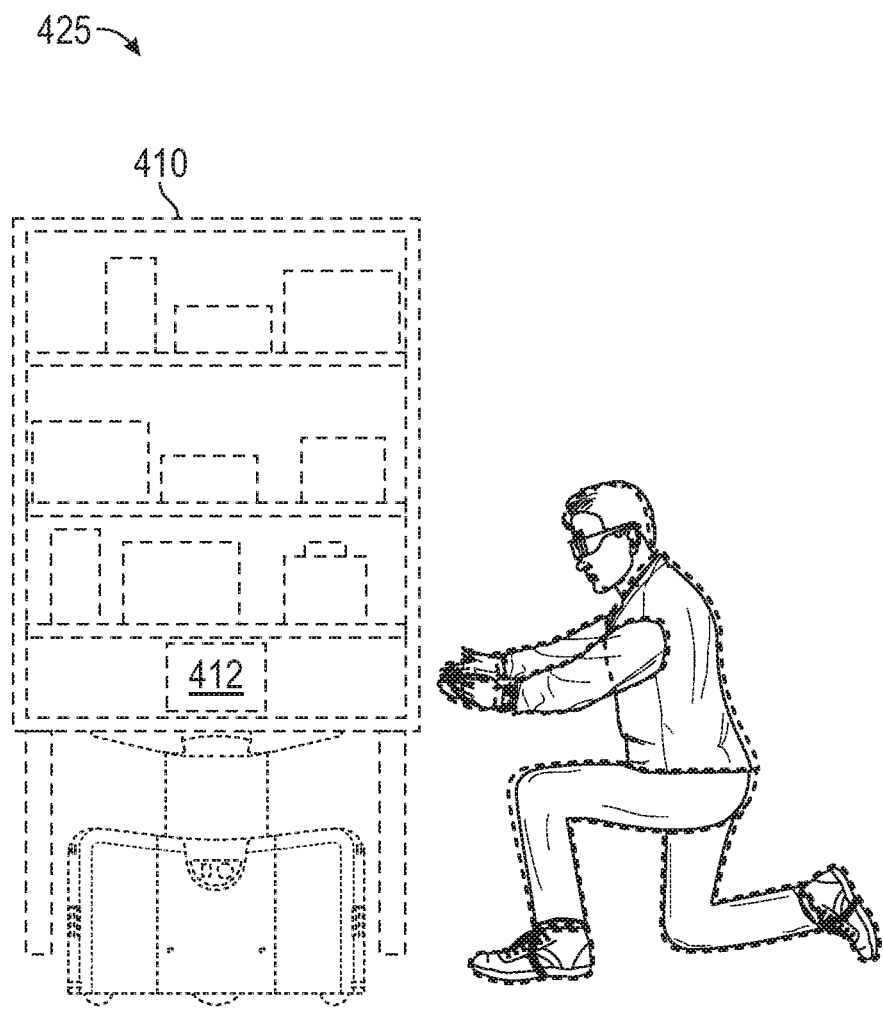

In one embodiment, the motion analysis component 315 can provide a graphical representation of a highly optimal manner of performing a given fulfillment task. For example, according to a particular embodiment, the motion analysis component 315 is configured to determine an optimal instance of motion data for performing a given fulfillment task under defined conditions (e.g., where an item has a defined size and shape, where an item is located in a particular bin of an inventory holder, etc.), using the training data 345 and/or one or more trained data models 353. The motion analysis component 315 could then provide the optimal instance of motion data to an immersive reality device 390, which could apply the motion data to a virtual avatar and could render frames depicting the virtual avatar performing the task. FIG. 8A-B illustrate an augmented reality environment that includes a virtual avatar performing a fulfillment operation, according to one embodiment described herein.

As shown in FIG. 8A, the environment 425 depicts the inventory holder 410 containing the package 412, and shows that the inventory holder 410 has not yet arrived at the pick station (as reflected by the dotted lines). In the illustrated embodiment, the employee is wearing an augmented reality headset (i.e., an immersive reality device 390), and a rendering component 392 for the immersive reality device 390 has rendered a virtual avatar (also shown in dotted lines) performing the fulfillment operation in an optimal manner. That is, the rendering component 392 has applied the optimal instance of motion data to a virtual avatar (e.g., a virtual character having a human shape and defined limbs, joints and movement constraints), so that the user can visualize the performance of the fulfillment operation in the highly optimal manner. In the depicted embodiment, the virtual avatar is shown as kneeling before the inventory holder 410 arrives (e.g., the user position 427 in FIG. 4B), so as to be able to retrieve the package 412 once the inventory holder 410 arrives at the station.

As part of a training exercise, the user could mimic the performance of the virtual avatar, as shown in FIG. 8B, where the user has knelt down to substantially match the position of the virtual avatar. In one embodiment, the motion analysis component 315 can continue to track the user's movement during the training exercise, by analyzing motion data collected by the motion capture system 220. Upon determining that the user's movement substantially deviates from the optimal movement being performed by the virtual avatar, the motion analysis component 315 could halt the performance of the fulfillment activity by the virtual avatar (e.g., pausing the playback of the motion data in the rendered frames), such that the virtual avatar remains frozen in the optimal position at a given moment in time. The motion analysis component 315 could continue monitoring the user's movement until the motion analysis component 315 determines that the user's position substantially matches the optimal position of the virtual avatar (e.g., as shown in FIG. 8B). In response, the motion analysis component 315 could resume playback of the optimal movement by the virtual avatar in the rendered frames. Doing so provides the user time to understand and mimic the virtual avatar's movement.

In one embodiment, the immersive reality device 390 could augment the speed of the virtual avatar's movement to enable the user to better mimic the virtual avatar's movement. For example, upon determining that the user's movement has substantially deviated from the optimal movement being performed by the virtual avatar, the immersive reality device 390 could render frames with a slow motion effect, thereby providing additional time for the user to observe and mimic the optimal movement being performed by the virtual avatar.

In a particular embodiment, the immersive reality device 390 is configured to provide an indication of real-time feedback to the user as the user performs fulfillment operations. As an example, the immersive reality device 390 could depict an efficiency meter that ranges from green to red, with green indicating high efficiency movement and red indicating low efficiency movement. The efficiency evaluation component 330 could evaluate the user's behavior in real-time by analyzing the motion data collected by monitoring the user using the trained data models 353. The immersive reality device 390 could then receive real-time indications of the user's efficiency and could update the depicted efficiency meter accordingly. As an example, the user could continue performing fulfillment operations until a low-efficiency movement is detected and the efficiency meter shows an efficiency score in red. The immersive reality device 390 could then display a sequence of frames providing feedback to the user, e.g., frames depicting a first virtual avatar performing the optimal movement and a second virtual avatar performing the user's movement that was determined to be inefficient. Of note, while the aforementioned example describes an efficiency meter having a sliding metric ranging from red to green, such an example is provided for illustrative purposes only and without limitation, and more generally, any suitable technique for providing real-time feedback to the user can be used, consistent with the functionality described herein.

Figure 9:
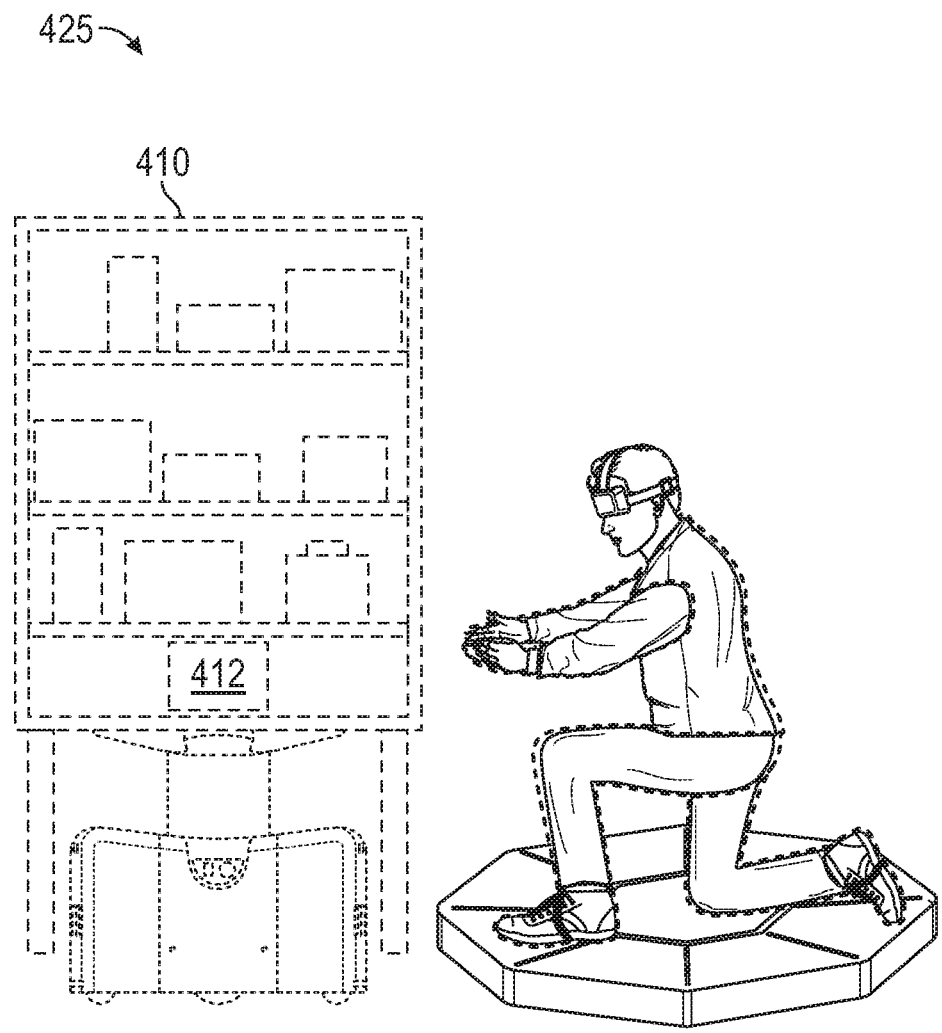
FIG. 9 illustrates reality environment that includes a virtual avatar performing a fulfillment operation, according to one embodiment described herein.

In some embodiments, the training system 150 can provide a fully virtual training experience for performing fulfillment operations. An example of such a virtual experience is shown in FIG. 9, which illustrates reality environment that includes a virtual avatar performing a fulfillment operation, according to one embodiment described herein. As shown, the user is wearing a virtual reality headset (i.e., an immersive reality device) and is positioned atop an active virtual reality motion platform. Generally, the active virtual reality motion platform enables the user to perform a variety of physical actions (e.g., walking, kneeling, running, jumping, etc.) while substantially remaining in place atop the active virtual reality motion platform. In such an environment, the user could move throughout a virtual fulfillment station, picking up packages, scanning containers, and so on, without physically leaving the active virtual reality motion platform. Doing so can provide a training environment for employees while maintaining a small physical footprint.

In the depicted embodiment, the rendering component 392 of the virtual reality headset has rendered frames depicting the virtual avatar in the kneeling position, based on the optimal instance of motion data received from the motion analysis component 315. Of note, however, in such an embodiment, a virtual depiction of the inventory holder 410 carrying the package 412 will be rendered by the rendering component 392. Likewise, once the package 412 is retrieved, the user would place the virtual package within a virtual container. Advantageously, such a virtual training environment allows employees to be trained and evaluated in an isolated environment. Moreover, by depicting the optimal movement being performed by the virtual avatar within the virtual environment, the employee being trained and/or evaluated can more easily see and understand how to improve his performance of the fulfillment operation.

Figure 10:
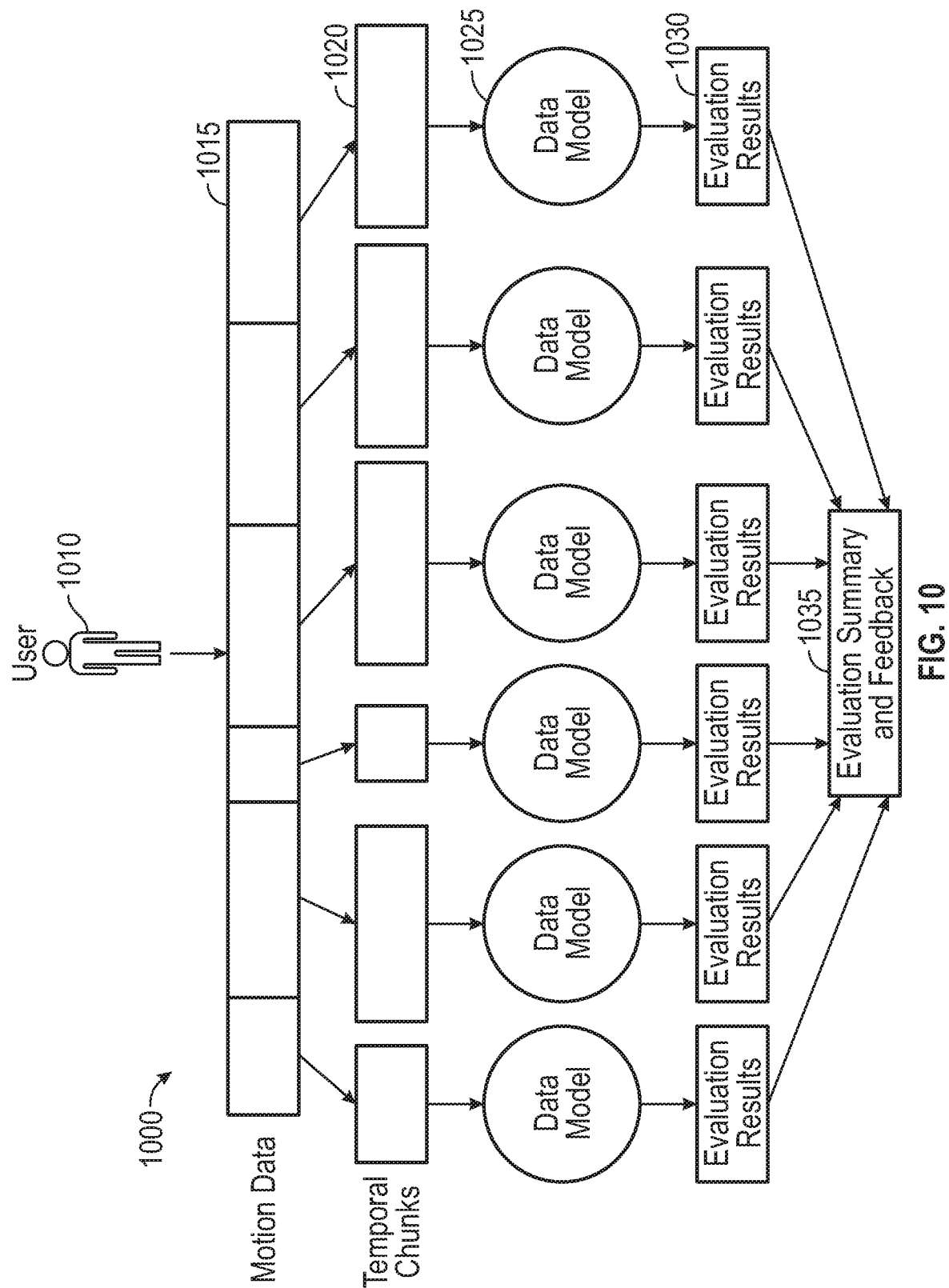
FIG. 10 illustrates a workflow for providing an evaluation summary and feedback for a performance of a fulfillment operation, according to one embodiment described herein.

FIG. 10 illustrates a workflow for providing an evaluation summary and feedback for a performance of a fulfillment operation, according to one embodiment described herein. As shown, the workflow 1000 begins at block 1010, where the motion capture system 220 monitors the movement of the user while the user performs a fulfillment operation (e.g., a pick operation, a stow operation, etc.). The motion data aggregation component 380 can analyze the data collected by the motion capture devices 375 (e.g., motion capture cameras) and can generate an instance of motion data which describes the user's movement in performing the fulfillment operation over a window of time (block 1015). The task analysis component 325 can analyze the instance of motion data and can divide the motion data into temporal chunks, where each chunk corresponds to a respective sub-task defined by the task definitions 350 (block 1020). For example, the task analysis component 325 could use one or more data models 353 trained to recognize the patterns of user motion when performing each of the sub-tasks.

In the depicted workflow 1000, the efficiency evaluation component 330 analyzes each of the temporal chunks using a respective data model 353 that is trained to analyze motion data for the corresponding sub-task (block 1025). Of note, while in the depicted embodiment a separate data model is used for analyzing each temporal chunk, such a depiction is provided for illustrative purposes only and more generally any machine learning schema can be used, consistent with the functionality described herein. For example, a neural network could be trained to analyze the instance of motion data as a whole and to output a respective one or more scores for each of the sub-tasks.

As shown, the data models each produces a set of evaluation results based on the analysis of the temporal chunks (block 1030). For example, such evaluation results could include a score for one or more metrics (e.g., as shown in FIG. 7 and discussed above). The evaluation results are then consolidated as evaluation summary and feedback, as shown in block 1035.

Figure 11:
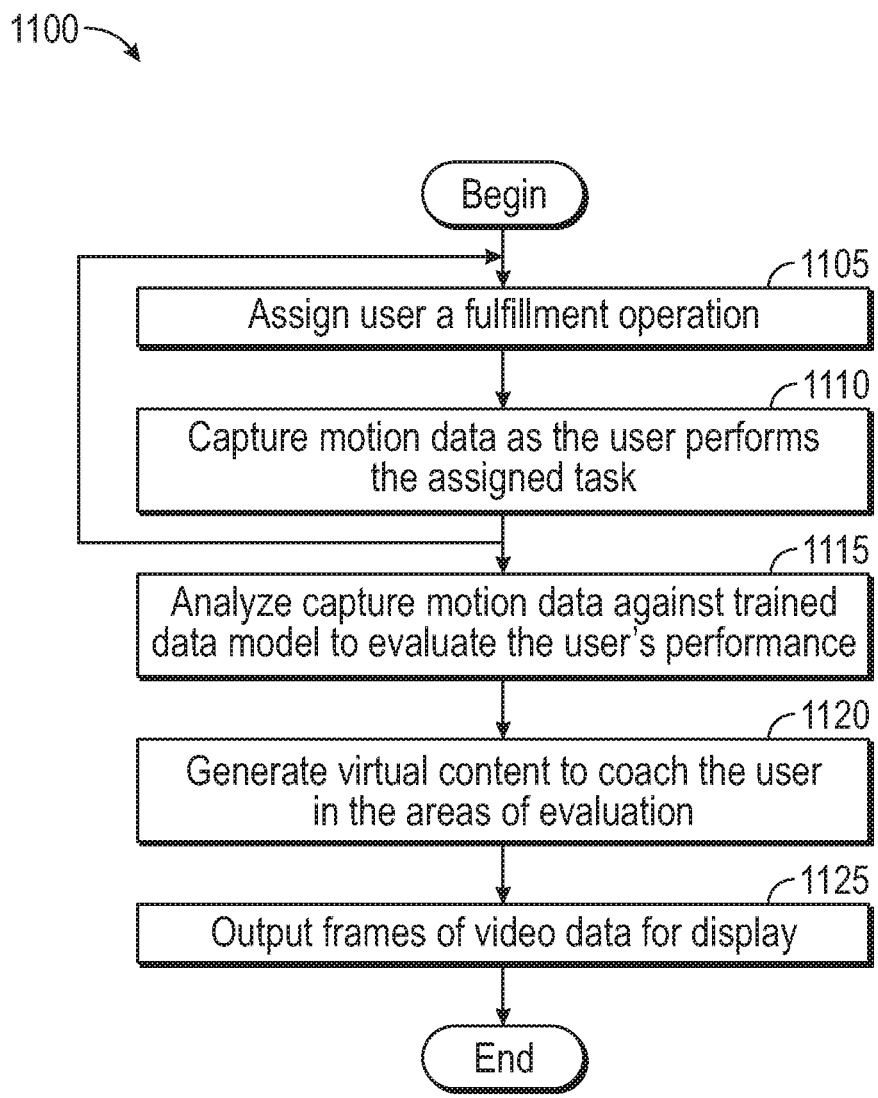
FIG. 11 is a flow diagram illustrating a method for generating virtual content for providing feedback for a performance of a fulfillment operation, according to one embodiment described herein.

FIG. 11 is a flow diagram illustrating a method for generating virtual content for providing feedback for a performance of a fulfillment operation, according to one embodiment described herein. As shown, the method 1100 begins at block 1105, where the motion analysis component 315 assigns a user a particular fulfillment operation. For example, the user could be wearing a virtual reality headset and standing atop an active virtual reality motion platform, as shown in FIG. 9 and discussed above, and the motion analysis component 315 could facilitate the rendering of frames (e.g., by transmitting instructions to the rendering component 392) instructing the user to perform a pick operation to retrieve an item from a particular bin of an inventory holder. As an example, the rendering component 392 could render a series of frames that include a virtual depiction of a display screen indicating that the next item will be positioned in Bin 3F when the virtual inventory holder arrives.

As shown in the method 1100, the motion capture system 220 captures motion data as the user performs the assigned task in the virtual environment (block 1110). The method 1100 could then return to block 1105, where the user is assigned another fulfillment operation and additional motion data is collected, until the motion analysis component 315 determines that sufficient motion data has been collected to evaluate the user's performance (e.g., once a predefined number of fulfillment operations have been completed by the user in the virtual environment). The motion analysis component 315 can then analyze the captured motion data against one or more trained data models 353 to evaluate the user's performance (block 1115).

In the depicted embodiment, the motion analysis component 315 then generates virtual content to coach the user in the areas of evaluation (block 1120). For example, as discussed above, the motion analysis component 315 could transmit optimal motion data for performing a given subtask to the immersive reality device 390 and the rendering component 392 could generate a sequence of frames depicting a virtual avatar performing the fulfillment operation by applying the optimal motion data to the virtual avatar. In a particular embodiment, upon identifying a particularly ineffective instance of motion data collected by the user (e.g., an instance of motion data for which the user was assigned a rating below a predefined threshold rating), the motion analysis component 315 could transmit the particularly ineffective instance of motion data to the immersive reality device 390, and the rendering component 392 could apply the motion data to a second virtual avatar. Doing so enables the user to visualize how his movement differed from the optimal movement for performing the fulfillment operation, and may help the user to understand the inefficiencies in his own movement. The rendering component 392 could then output the rendered frames for display using the display device(s) 394 (block 1125), and the method 1100 ends.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:
    determining a plurality of sub-tasks for carrying out a fulfillment operation;
    retrieving a training set of motion data that includes a plurality of training motion data samples, each specifying motion data over a respective window of time;
    training a first data model to classify instances of motion data into temporal chunks, based on the plurality of sub-tasks;
    training at least one data model to assess performance of the fulfillment operation, using the training set of motion data;
    determining an instance of motion data describing motion performed in carrying out the fulfillment operation, comprising:
        capturing, via one or more camera devices, images of a user performing the fulfillment operation;
        tracking, based on the captured images, movement of one or more markers on a motion capture device worn by the user; and
        generating the instance of motion data based on the movement of the one or more markers;
    dividing the instance of motion data into a plurality of temporal chunks, using the first data model;
    generating a measure of quality for the instance of motion data, by analyzing the plurality of temporal chunks of the instance of motion data using the trained at least one data model, wherein generating the measure of quality comprises generating a quality score for at least one first sub-task of the plurality of sub-tasks; and
    upon determining that the quality score for the first sub-task satisfies a predetermined condition, rendering, to the user via an immersive reality device, during performance of the fulfillment operation, a plurality of frames depicting motion of the performance of the first sub-task based on one of the plurality of temporal chunks of the instance of motion data corresponding to the first sub-task of the plurality of sub-tasks.

2. The method of claim 1, wherein the training set of motion data comprises a plurality of positive motion data samples and a plurality of negative motion data samples.

3. The method of claim 1, wherein training the at least one data model to assess performance of the fulfillment operation, using the training set of motion data, comprises training a plurality of data models to assess the performance of the fulfillment operation, wherein each of the plurality of data models corresponds to a respective one of the plurality of sub-tasks.

4. The method of claim 1, wherein the quality score for the at least one first sub-task of the plurality of sub-tasks comprises a plurality of scores, each corresponding to a different performance metric for the first sub-task.

5. The method of claim 1, wherein training a first data model to classify instances of motion data into temporal chunks, based on the plurality of sub-tasks, further comprises:
    receiving, for each of the plurality of training motion data samples, a respective time window within the training motion data samples that corresponds to each of the plurality of sub-tasks,
    wherein the first data model is trained to classify instances of motion data into temporal chunks, based on the time windows for each of the plurality of training motion data samples and each of the plurality of sub-tasks.

6. The method of claim 1, wherein the fulfillment operation comprises at least one of a pick operation and a stow operation.

7. The method of claim 6, wherein the plurality of sub-tasks further comprise at least logging into a workstation, selecting a workflow, waiting on a pod to arrive, scanning a container, picking a product out of the container, identifying a target bin for the product, placing the product in the target bin, and scanning the target bin.

8. The method of claim 1, wherein the predetermined condition comprises the quality score being less than a predefined threshold score associated with the first sub-task.

9. A method, comprising:
   receiving an instance of motion data describing motion performed by an operator in carrying out a fulfillment operation, the motion data having been captured by a motion capture system tracking, via one or more first motion capture devices, movement of a second motion capture device worn by the operator during performance of the fulfillment operation;
   determining, for at least one portion of the instance of motion data, which sub-task of a plurality of sub-tasks of the fulfilment operation corresponds to the at least one portion of the instance of motion data, based on a first data model;
   analyzing the instance of motion data using at least one data model trained with historically collected motion data;
   determining a measure of quality for the instance of motion data, based on the analysis, wherein determining the measure of quality comprises determining a quality score for the sub-task corresponding to the at least one portion of the instance of motion data; and
   upon determining that the quality score for the sub-task satisfies a predetermined condition, rendering, to the operator via an immersive reality device, during the performance of the fulfillment operation, a plurality of frames depicting motion of the performance of the sub-task based on the at least one portion of the instance of motion data.

10. The method of claim 9, further comprising:
    retrieving a training set of motion data that includes a plurality of training motion data samples, each specifying motion data over a respective window of time; and
    training the first data model to classify instances of motion data into portions, based on the plurality of sub-tasks.

11. The method of claim 10, further comprising:
    training a plurality of data models to assess performance of the fulfillment operation, using the training set of motion data.

12. The method of claim 11, wherein analyzing the instance of motion data using the at least one data model trained with historically collected motion data further comprises:
    assessing performance of each portion of the instance of motion data, using a respective one of the plurality of data models; and
    generating an overall quality assessment of the performance of the fulfillment operation described by the instance of motion data, based on the performance assessment of the portions of the instance of motion data.

13. The method of claim 9, wherein:
    the one or more first motion capture devices comprise camera devices; and
    tracking the movement of the second motion capture device comprises capturing, via the camera devices, images of one or more markers on the second motion capture device during performance of the fulfillment operation.

14. The method of claim 9, wherein tracking the movement of the second motion capture device comprises:
    detecting, via the first motion capture device, one or more signals emitted by the second motion capture device during performance of the fulfillment operation; and
    determining, for each of the one or more signals, a respective set of location coordinates corresponding to a different position of the second motion capture device over a period of time during the performance of the fulfillment operation.

* * * * *